(12) United States Patent
Fattouche et al.

(10) Patent No.: US 6,330,452 B1
(45) Date of Patent: Dec. 11, 2001

(54) NETWORK-BASED WIRELESS LOCATION SYSTEM TO POSITION AMPS (FDMA) CELLULAR TELEPHONES, PART I

(75) Inventors: Michel Fattouche; Andrew Borsodi; Richard Klukas, all of Calgary (CA)

(73) Assignee: Cell-Loc Inc., Calgary (CA)

( * ) Notice: Subject to any disclaimer, the term of this patent is extended or adjusted under 35 U.S.C. 154(b) by 0 days.

(21) Appl. No.: 09/130,637

(22) Filed: Aug. 6, 1998

(51) Int. Cl.$^7$ ................................ H04Q 7/20; G01S 3/02
(52) U.S. Cl. ................. 455/456; 455/524; 455/67.6; 342/457
(58) Field of Search .................... 455/456, 507, 455/524, 526, 440, 67.1, 67.6; 342/387, 457

(56) References Cited

U.S. PATENT DOCUMENTS

| | | | |
|---|---|---|---|
| 3,384,891 | 5/1968 | Anderson | 342/357.01 |
| 3,609,568 | 9/1971 | Jackson | 708/306 |
| 3,646,580 | 2/1972 | Fuller et al. | 455/524 |
| 3,680,121 | 7/1972 | Anderson et al. | 342/457 |
| 4,177,466 | 12/1979 | Reagan | 342/457 |
| 4,297,701 | 10/1981 | Henriques | 342/42 |
| 4,310,722 * | 1/1982 | Schaible | 455/33 |
| 4,433,335 | 2/1984 | Wind | 342/463 |
| 4,596,988 | 6/1986 | Wanka | 342/457 |
| 4,638,321 | 1/1987 | Drogin | 342/444 |
| 4,639,733 | 1/1987 | King et al. | 342/424 |
| 4,651,156 | 3/1987 | Martinez | 342/457 |
| 4,651,157 | 3/1987 | Gray et al. | 342/457 |
| 4,728,959 | 3/1988 | Maloney et al. | 342/457 |
| 4,742,357 | 5/1988 | Rackley | 342/457 |
| 4,791,572 | 12/1988 | Green, III et al. | 701/207 |
| 4,797,679 * | 1/1989 | Cusdin et al. | 342/387 |
| 4,818,998 | 4/1989 | Apsell et al. | 342/444 |

(List continued on next page.)

FOREIGN PATENT DOCUMENTS

| | | | |
|---|---|---|---|
| 2108103 | 4/1995 | (CA) | G06F/7/00 |
| 0 892 278 A | 1/1999 | (EP) | G01S/5/02 |
| WO 93/06685 | 4/1993 | (WO) | H04Q/7/00 |
| 99/33287 | 7/1999 | (WO) | H04Q/7/00 |

OTHER PUBLICATIONS

Chennakeshu, S.; Hassan, A.; Anderson, J., "A Comparison of Diversity Schemes for a Mixed–Mode Slow Frequency–Hopped Cellular System," Global Telecommunications Conference, including a Communications Theory Mini–Conference (1993).

(List continued on next page.)

Primary Examiner—William Trost
Assistant Examiner—Rafael Perez-Gutierrez
(74) Attorney, Agent, or Firm—Christensen O'Connor Johnson Kindness PLLC

(57) ABSTRACT

The intention of the invention is to produce a network-based Wireless Location System (WLS) whereby existing Advanced Mobile Phone System (AMPS) Frequency Division Multiple Access (FDMA) Cellular Telephones (CTs) can be located passively without modification to the CTs or to the cellular antenna infrastructure. More specifically, the invention consists of methods and apparatus to estimate the position and velocity of a Cellular Telephone (CT) using either the Time Of Arrival (TOA) of a signal transmitted by the CT, its Phase Of Arrival (POA), its Frequency Of Arrival (FOA), or a combination thereof, at several antennas at a number of Monitoring Sites (MSs). In order to solve for the coordinates of the CT, the patent uses either hyperbolic multilateration based on Time Difference Of Arrival (TDOA), or linear multiangulation based on Phase Difference Of Arrival (PDOA), or both. In order to solve for the velocity of the CT, the patent uses FOA based on Frequency Difference Of Arrival (FDOA). An important contribution of this invention is the way the CT is forced to transmit radio signals for location purposes. Another important contribution is the application of Super-Resolution (SR) techniques to increase the resolution of the estimated TOAs, POAs or FOAs.

17 Claims, 12 Drawing Sheets

U.S. PATENT DOCUMENTS

| | | | |
|---|---|---|---|
| 4,870,422 | 9/1989 | Counselman, III | 342/357.12 |
| 4,891,650 | 1/1990 | Sheffer | 342/457 |
| 4,908,629 | 3/1990 | Apsell et al. | 342/457 |
| 4,916,455 | 4/1990 | Bent et al. | 342/457 |
| 4,926,161 | 5/1990 | Cupp | 340/988 |
| 4,975,710 | 12/1990 | Baghdady | 342/442 |
| 5,003,317 | 3/1991 | Gray et al. | 342/457 |
| 5,008,679 | 4/1991 | Effland et al. | 342/353 |
| 5,023,809 | 6/1991 | Spackman et al. | 700/90 |
| 5,023,900 | 6/1991 | Tayloe et al. | 379/32 |
| 5,055,851 | 10/1991 | Sheffer | 342/457 |
| 5,095,500 | 3/1992 | Tayloe et al. | 379/32 |
| 5,101,501 | 3/1992 | Gilhousen et al. | 455/442 |
| 5,126,748 | 6/1992 | Ames et al. | 342/353 |
| 5,128,623 | 7/1992 | Gilmore | 327/107 |
| 5,153,902 | 10/1992 | Buhl et al. | 455/414 |
| 5,166,694 * | 11/1992 | Russell et al. | 342/457 |
| 5,173,710 | 12/1992 | Kelley et al. | 342/457 |
| 5,208,756 | 5/1993 | Song | 455/456 |
| 5,218,618 | 6/1993 | Sagey | 375/130 |
| 5,293,645 | 3/1994 | Sood | 455/456 |
| 5,317,323 | 5/1994 | Kennedy et al. | 342/457 |
| 5,327,144 * | 7/1994 | Stilp et al. | 342/387 |
| 5,404,376 | 4/1995 | Dent | 375/138 |
| 5,412,388 | 5/1995 | Attwood | 701/207 |
| 5,508,708 | 4/1996 | Ghosh et al. | 342/457 |
| 5,512,908 * | 4/1996 | Herrick | 342/387 |
| 5,537,460 * | 7/1996 | Holliday, Jr, et al. | 455/435 |
| 5,570,305 | 10/1996 | Fattouche et al. | 708/203 |
| 5,600,706 | 2/1997 | Dunn et al. | 455/456 |
| 5,614,914 | 3/1997 | Bolgiano et al. | 342/457 |
| 5,629,707 | 5/1997 | Heuvel et al. | 342/357 |
| 5,640,698 | 6/1997 | Shen et al. | 455/325 |
| 5,646,632 | 7/1997 | Khan et al. | 342/375 |
| 5,663,734 | 9/1997 | Krasner | 342/357.12 |
| 5,666,662 | 9/1997 | Shibuya | 455/456 |
| 5,724,660 | 3/1998 | Kauser et al. | 455/456 |
| 5,736,964 | 4/1998 | Ghosh et al. | 342/457 |
| 5,758,288 | 5/1998 | Dunn et al. | 455/456 |
| 5,764,188 | 6/1998 | Ghosh et al. | 342/457 |
| 5,764,687 | 6/1998 | Easton | 375/147 |
| 5,781,156 | 7/1998 | Krasner | 342/357.12 |
| 5,844,522 * | 12/1998 | Sheffer et al. | 342/457 |
| 5,883,598 * | 3/1999 | Parl et al. | 342/457 |
| 5,890,068 * | 3/1999 | Fattouche et al. | 455/456 |
| 5,973,643 * | 10/1999 | Hawkes et al. | 342/457 |
| 5,987,329 | 11/1999 | Yost et al. | 455/456 |
| 5,999,126 | 12/1999 | Ito | 342/357.1 |
| 6,005,876 | 12/1999 | Cimini, Jr. et al. | 370/525 |
| 6,031,490 | 2/2000 | Forssen et al. | 342/457 |
| 6,047,192 | 4/2000 | Maloney et al. | 455/456 |
| 6,073,013 | 6/2000 | Agre et al. | 455/428 |
| 6,236,365 | 5/2001 | LeBlanc et al. | 342/457 |

OTHER PUBLICATIONS

Scott, K.E.; Olasz, E.B., "Simultaneous Clock Phase and Frequency Offset Estimation," *IEEE Transactions on Communications* 43(7):2263–2270. (Jul. 1995).

Spilker, J.J. Jr., *GPS Signal Structure and Performance Characteristics*, Global Positioning System, vol. I, The Institute of Navigation, Washington D.C., 1980, reprinted by The Institute of Navigation, Alexandria, Virginia, pp. 29–54.

Haykin, S.,*Adaptive Filter Theory*, Second Edition, Prentice Hall, Englewood Cliffs, New Jersey, 1991, pp. 449–450.

Haykin, S., *An Introduction to Analog and Digital Communications*, John Wiley & Sons, New York, 1989, pp. 327–332.

Vanicek, P. and Krakiwsky, E.J., *Geodesy; The Concepts*, North–Holland Publishing Company, Amsterdam, 1982, p. 214, pp. 231–239.

Chaffee, J.W. and Abel, J.S., *Bifurcation of Pseudorange Equations*, Proceedings of the 1993 National Technical Meeting, San Francisco, California, Jan. 20–22, 1993, The Institute of Navigation, pp. 203–211.

Schau, H.C. and Robinson, A.Z., Passive Source Localization Employing Intersecting Spherical Surfaces from Time–of–Arrival Differences, IEEE Transactions of Acoustics, Speech, and Signal Processing, vol. ASSP–35, No. 8, Aug. 1987, pp. 1223–1225.

Bancroft, S., *An Algebraic Solution of the GPS Equations*, IEEE Transactions on Aerospace and Electronic Systems, vol. AES–21, No. 7, Jan. 1985, pp. 56–59.

Chan, Y.T. and Ho, K.C., A Simple and Efficient Estimator for Hyperbolic Location, IEEE Transactions on Signal Processing, vol. 42, No. 8, Aug. 1994, pp. 1905–1915.

Schmidt, R.O., A New Approach to Geometry of Range Difference Location, IEEE Transactions on Aerospace and Electronic Systems, vol. AES–8, No. 6, Nov. 1972,,pp. 821–835.

Announcement—*FCC Adopts Rules to Implement Enhanced 911 for Wireless Services*, NEWSReport No. DC 96–52, Jun. 12, 1996, 1 page.

Parsons, J.D., *The Mobile Radio Propagation Channel*, Halsted Press, a Division of John Wiley & Sons, Inc., New York, 1992, pp. pp. 4–15, 110–113.

Krizman, Kevin J., et al., *Wireless Position Location: Fundamentals, Implementation Strategies, and Sources of Error*, Bradley Dept. of Electrical Engineering, Virginia Tech, pp. 919–923, Apr. 5, 1997.

Abstract of U.S. Patent No. 5,379,047, Yokev et al, Jan. 3, 1995, 3 pages.

Abstract of U.S. Patent No. 5,583,517, Yokev, et al, Dec. 10, 1996, 3 pages.

Abstract of U.S. Patent No. 5,537,460, Holliday, Jr., et al, Jul. 16, 1996, 2 pages.

Abstract of U.S. Patent No. 4,740,792, Sagey, et. al., Apr. 26, 1988, 2 pages.

Abstract of U.S. Patent No. 5,335,246, Yokev, et. al., Aug. 2, 1994, 1994, 4 pages.

Abstract of U.S. Patent No. 5,365,451, Wang, et al., Nov. 15, 1994, 2 pages.

Abstract of U.S. Patent No. 5,519,760, Borkowski, et. al., May 21, 1996, 2 pages.

Abstract of U.S. Patent No. 5,519,621, Wortham, May 21, 1996, 4 pages,

Abstract of U.S. Patent No. 5,490,203, Feb. 6, 1996, 2 pages.

Abstract of U.S. Patent No. 5,365,516, Nov. 15, 1994, 3 pages.

Abstract of U.S. Patent No. 5,166,694, Nov. 24, 1992, 2 pages.

Abstract of U.S. Patent No. 5,119,102, Jun. 2, 1992, 1 page.

Abstract of U.S. Patent No. 4,700,374, Oct. 13, 1987, 2 pages.

Abstract of U.S. Patent No. 4,665,404, May 12, 1987, 2 pages.

Abstract of U.S. Patent No. 4,359,733, Nov. 16, 1982, 3 pages.

Abstract of U.S. Patent No. 5,280,457, Jan. 18, 1994, 2 pages.
Abstract of U.S. Patent No. 4,799,062, Jan. 17, 1989, 3 pages.
Abstract of U.S. Patent No. 5,218,367, Jun. 8, 1993, 2 pages.
Abstract of U.S. Patent No. 5,293,642, Mar. 8, 1994, 1 page.
Abstract of U.S. Patent No. 5,479,482, Dec. 26, 1995, 2 pages.
Abstract of U.S. Patent No. 5,418,537, May 23, 1995, 2 pages.
Smith, Jr. William Whitfield, School of Electrical Engineering, Georgia Institute of Technology, Atlanta, Georgia, Passive Location of Mobile Cellular Telepohone Terminals, IEEE, CH3031–2/91/000–0221,1.001991.
Hata, M., "Empirical Formula for Radio Propagation Loss in Land Mobile Radio Services," IEEE Transactions on Vehicular Technology, vol. VT–29, No. 3, Aug. 1980.
Dumont, L.R., et al., "Super–resolution of Multipath Channels in a Spread Spectrum Location System," IEEE Electronic Letters, vol. 30, No. 19, pp. 1583–1584, Sep. 15, 1994.

Schmidt, R., "Least Squares Range Difference Location," IEEE Transactions on Aerospace and Electronic Systems, vol. 32, No. 1, Jan. 1996.
Turin, G.L. et al., "A Statistical Model of Urban Multipath Propagation," IEEE Transactions on Vehicular Technology, vol. VT–21, No. 1, Feb. 1972.
Smith, J.O. et al., "Closed–Form Least–Squares Source Location Estimation from Range–Difference Measurements," IEEE Transactions on Acoustics, Speech, and Signal Processing, vol. ASSP–35, No. 12, Dec. 1987.
Ziskind, I. et al., "Maximum Likelihood Localization of Multiple Sources by Alternating Projection," IEEE Transactions on Acoustics, Speech, and Signal Processing, vol. ASSP–36, No. 10, Oct. 1988.
Morley, G.D. et al., "Improved Location Estimation with Pulse–ranging in Presence of Shadowing and Multipath Excess–delay Effects," Electronics Letters, vol. 31, No. 18, pp. 1609–1610, Aug. 1995.

* cited by examiner

Trajectory for $TDOA_{2,1,k,m} = \tau_{2,k} - \tau_{1,m}$

NETWORK-BASED WIRELESS LOCATION SYSTEM TO POSITION AMPS (FDMA) CELLULAR TELEPHONES, PART I

FIELD OF THE INVENTION

This invention relates to location finding and tracking of Advanced Mobile Phone System (AMPs) Frequency Division Multiple Access (FDMA) Cellular Telephones (CTs) using a network-based Wireless Location System (WLS). FDMA is a multiple access technique used in some standards worldwide such as in AMPs which is the North American standard for analog CTs. Other standards exist such as Time Division Multiple Access (TDMA) and Code Division Multiple Access (CDMA). A unique feature in FDMA (which the patent takes advantage of) is the continuous transmission of information over one frequency band (e.g. during "conversation" mode or during "waiting for answer" mode) as long as no hand-offs, call termination nor call drop take place. A network-based WLS is important since it can be passive, and is able to locate existing CTs without modification to the CTs or to the cellular antenna infrastructure.

The need for wireless location finding and tracking of CTs is ever increasing. Some of the possible services for locating CTs are:

1. Enhanced Emergency Services:

In recent years pressure has been mounting for the development of technology to position CTs. The primary driving force has been enhanced 911 (E911) services for wireless telephone subscribers. E911 services provide the 911 operator with information such as calling number, street address, and the primary subscriber's name. A rule concerning E911 emergency calling systems was released by the FCC in October, 1996 (CC Docket No. 94-102) and clarified in December 1997. In the document, the FCC requires that by October 2001, a wireless 911 caller be located with a horizontal accuracy of 125 meters RMS (Root Mean Square).

2. Tracking of Fraudulent Calls.
3. Tracking of Stolen Vehicles:

Conventionally, to track stolen vehicles requires installing an RF tag such as in Bird, U.S. Pat. No. 5,418,537 issued May, 23, 1995, leaving it permanently on in each vehicle to be tracked and a new infrastructure for the MSs throughout the desired service area. An alternative solution is to use existing CTs instead to take advantage of the existing cellular coverage and the broad availability of inexpensive CTs.

4. Fleet Management for Courier and Transportation Businesses:

Once again, to manage a fleet requires installing an RF tag such as in Song, U.S. Pat. No. 5,208,756 issued May, 4, 1993, and Sheffer et al., U.S. Pat. No. 5,218,367 issued Jun. 8, 1993. Instead, existing CTs can be used to take advantage of the existing cellular coverage and the broad availability of inexpensive CTs.

5. Pursuit of Criminals who use a CT During a Crime.

In this case, it is important for the WLS to be passive. This is possible in a network-based WLS.

6. Location-sensitive Billing.

Without loss of generality, we will adopt throughout this document an AMPs-based Cellular Telephone as an example for the CT to be located. Such a choice for an FDMA CT does not preclude any other FDMA standards and in most cases does not preclude other standards such as Time Division Multiple Access (TDMA) and Code Division Multiple Access (CDMA). In this patent, Cellular Telephones include PCS (Personal Communication Systems) telephones, cordless telephones and radio tags that do not contain the audio portion of the telephone. Prior art for locating AMPs-based CTs is well documented in Smith, W. W. Jr., "Passive Location of Mobile Cellular Telephone Terminals," Proceedings 25th Annual IEEE International Carnahan Conference on Security Technology, Taipei, Taiwan, Oct. 1–3, 1991.

Without loss of generality, we will assume throughout this document that the intention of the WLS is to estimate the horizontal position of the CT as well as its horizontal velocity. In case both the vertical and the horizontal position of a CT are to be estimated, an extra independent equation is required in addition to the minimum number required for horizontal positioning.

DESCRIPTION OF THE FIGURES

Following FIG. 1.

1. high gain antennas (either diversity or sectored) with good RF coverage and appropriate RF front end,
2. high speed link to the Mobile Switching Center (MSC) using either a T1-Link or a wired telephone link (Plain Old Telephones (POTs)), and
3. convenient weather-proof temperature-regulated housing with regulated power supply.

Figure 2:
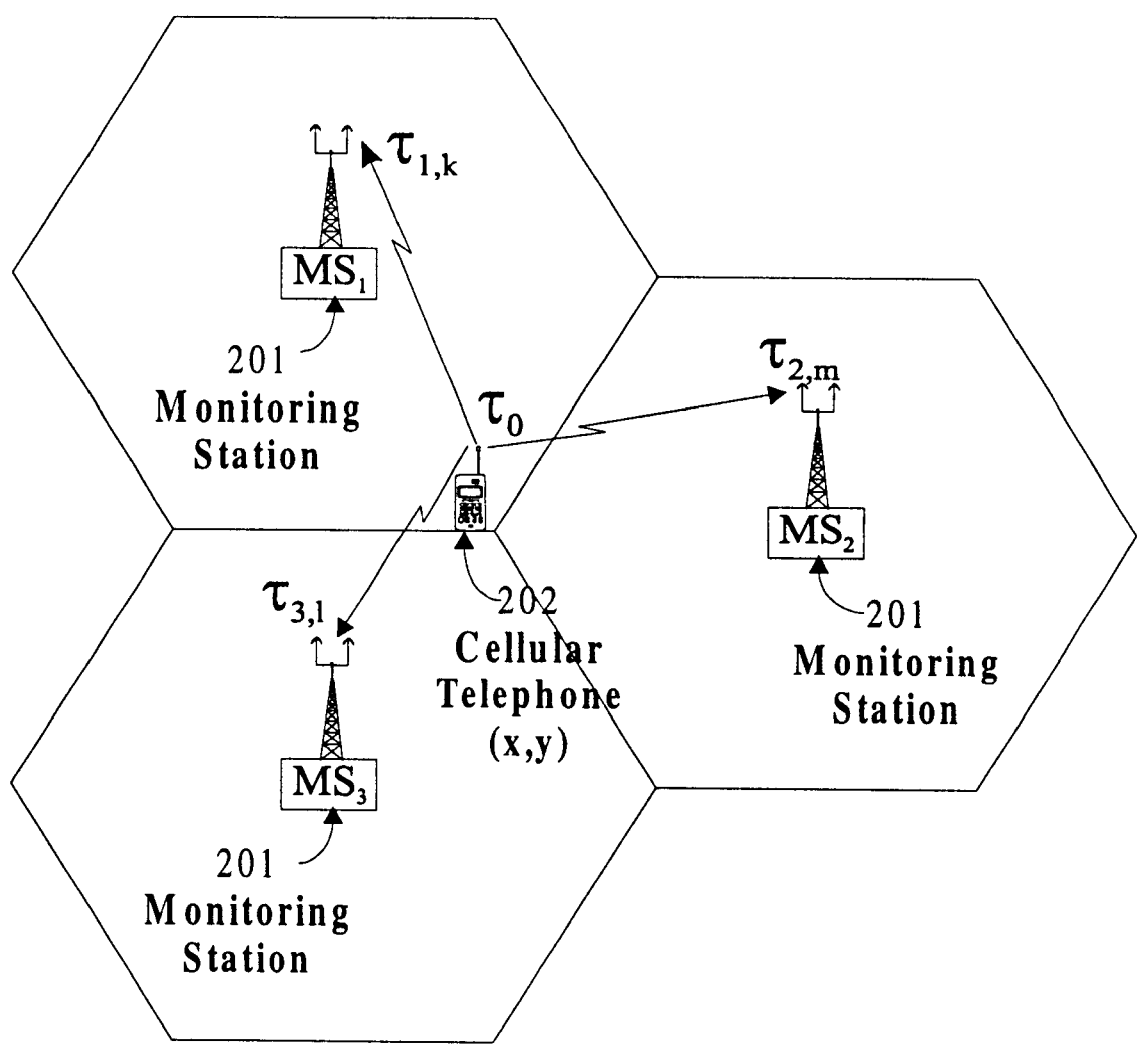
FIG. 2 illustrates the transmission of the signal s(t) by the CT at Time '$\tau_o$' and its reception by the $k^{th}$ antenna at the $i^{th}$ Monitoring Site (MS) (201) at Time of Arrival: is $\tau_{i,k}$. In order to solve for the horizontal coordinates (x,y) of the CT (202), a minimum of three MSs (with a minimum of one antenna per MS) are required using TDOA positioning, or a minimum of two MSs (with a minimum of two horizontally spaced antennas per MS) using Angle Of Arrival (AOA) positioning. In either case, it is possible to take advantage of the cellular infrastructure by locating the MSs at the BS sites, thereby using their.

It is however possible to place the MSs at locations that are independent from the cellular BSs since the patent does not require any assistance from the BSs or from the MSC. Without loss of generality, FIG. 2 assumes that each MS (201) has two antennas.

Figure 3:
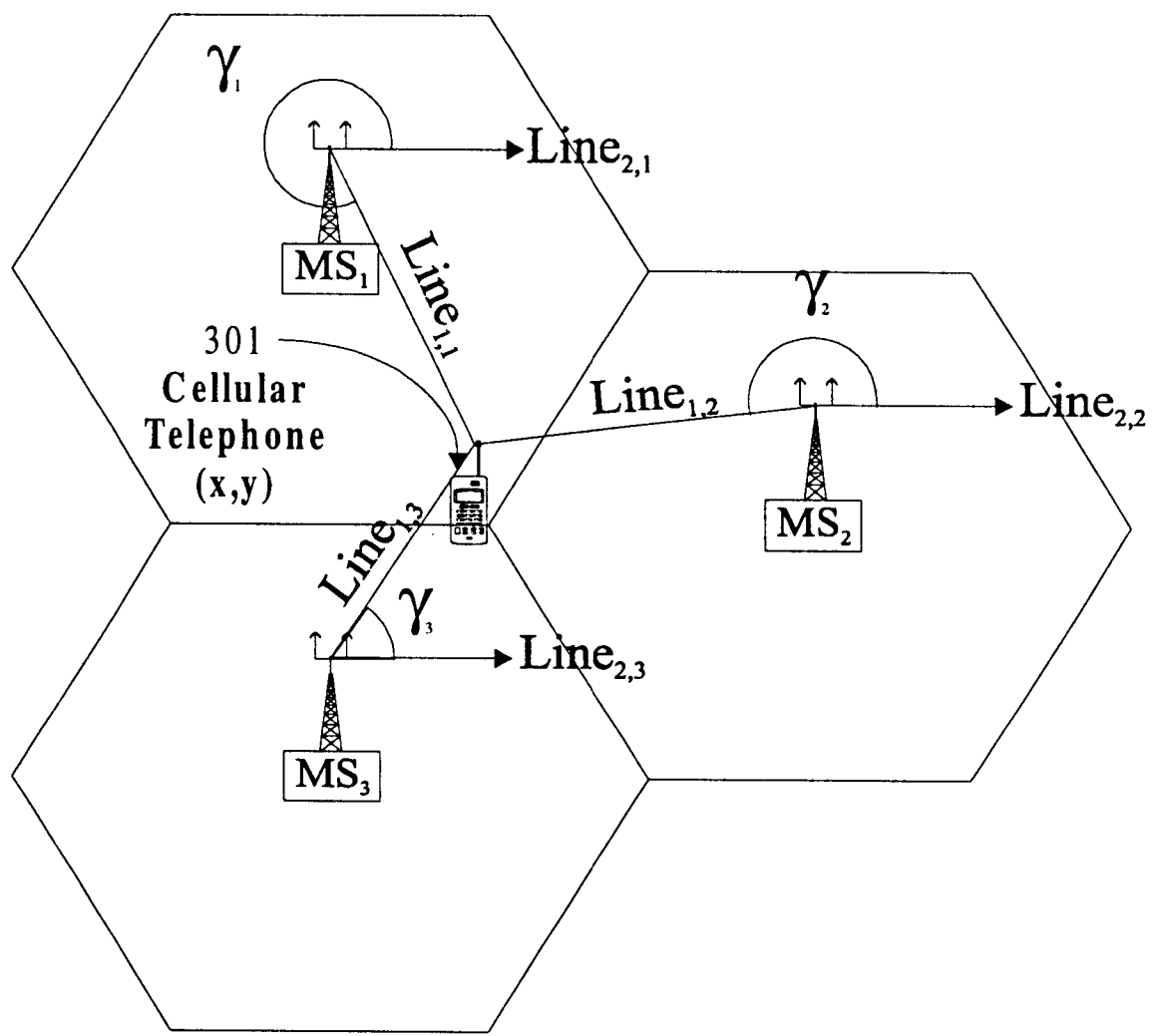

FIG. 3 assumes without loss of generality, that each MS has two antennas. FIG. 3 also assumes that the CT is far from each MS with respect to the baseline between the two antennas at each MS. The second assumption implies that the received wavefront is planar, i.e. $\gamma_{i,1}=\gamma_{i,2}=\gamma_i$, where:

$\gamma_{i,1}$ is the Angle Of Arrival (AOA), at the first antenna of the $i^{th}$ MS, $\gamma_{i,2}$ is the AOA at the second antenna of the $i^{th}$ MS, and $\gamma_i$ is defined as the angle formed between:
1. the line joining the CT (301) and the $i^{th}$ MS (which we refer to as line$_{1,i}$) and,
2. the line joining the two antennas at the $i^{th}$ MS (which we refer to as line$_{2,i}$);

in a clockwise manner from line$_{1,i}$ to line$_{2,i}$, where i=1, 2, 3.

Figure 4:
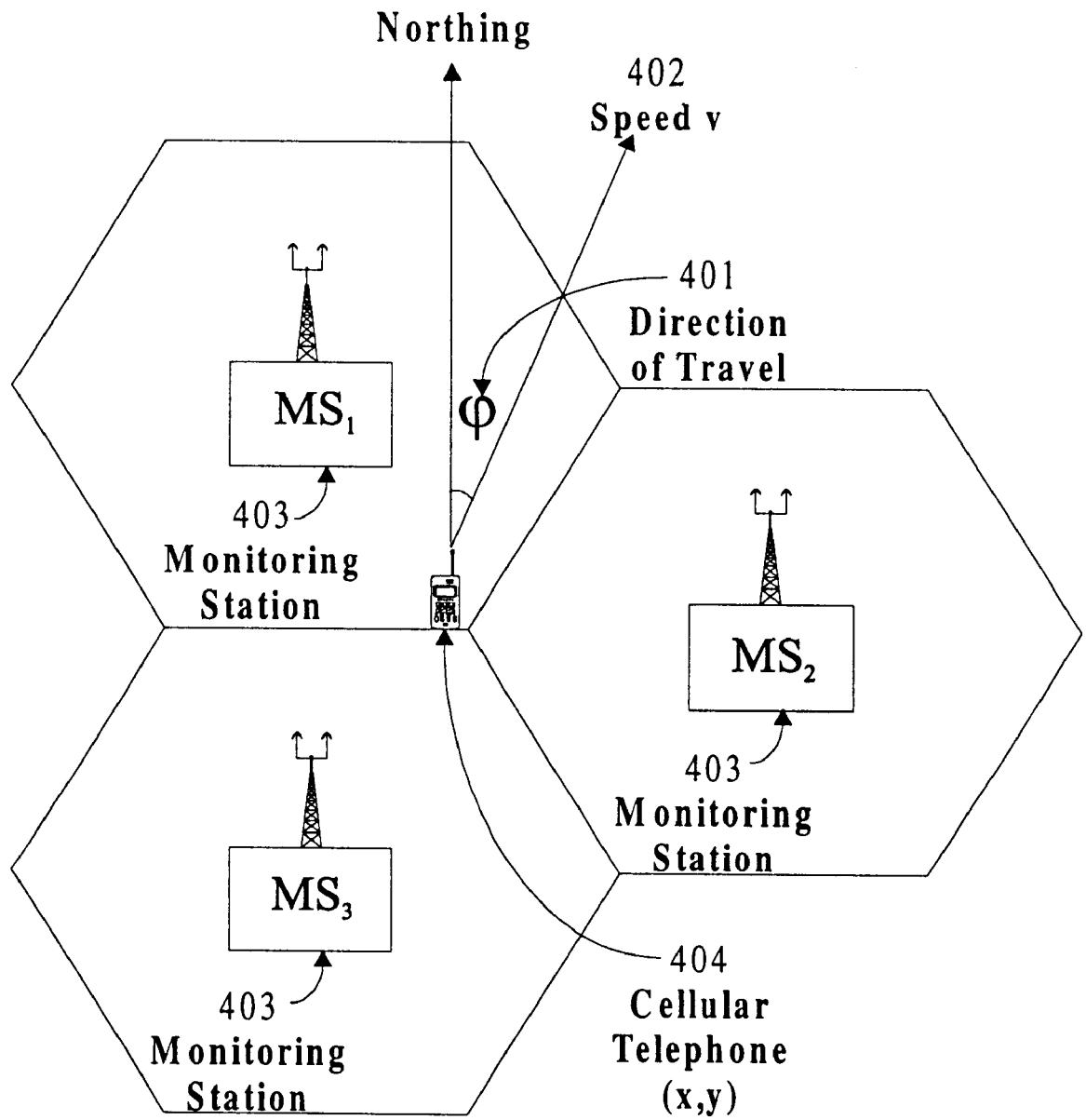

FIG. 4 illustrates the Direction of Travel (DOT) '$\phi$' (401) relative to Northing (in a clockwise manner from Northing) and the speed v (402) of the CT (404) of coordinates (x,y) which together represent the velocity $\vec{v}$ of the CT. The $k^{th}$ antenna at the $i^{th}$ MS (403) of coordinates $(x_{i,k}, y_{i,k}, z_{i,k})$ receives the signal $r_{i,k}(t)$, processes it and transfers the positional information regarding the CT to a central processor, where i=1, 2, 3.

Figure 5:
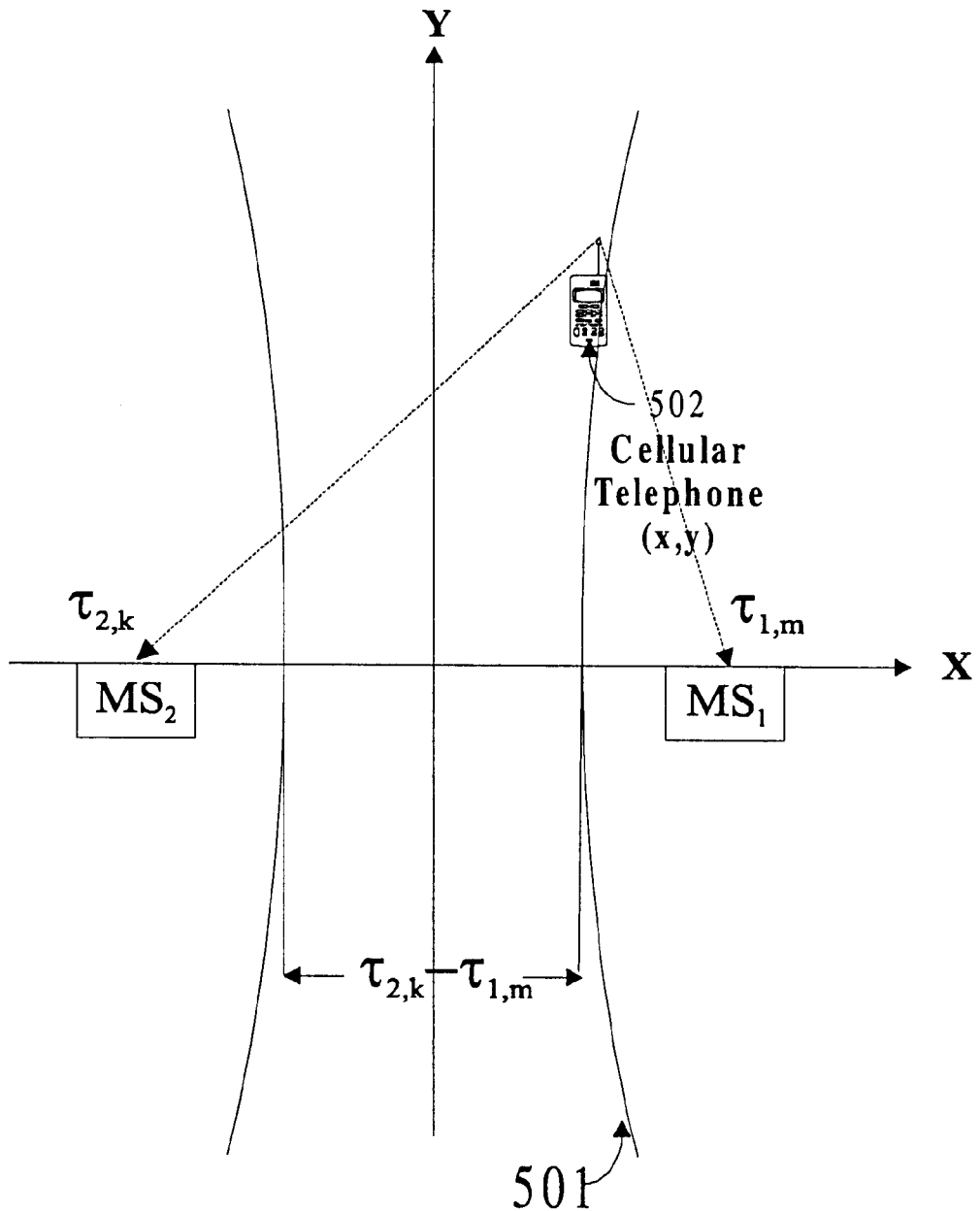

Without loss of generality, FIG. 5 illustrates the two-dimensional (horizontal) Line of Position (501) for $TDOA_{2,1,k,m}$ which is defined as $$TDOA_{2,1,k,m} = \tau_{2,k} - \tau_{1,m} \quad (1)$$

$$= (\tau_{2,k} - \tau_o) - (\tau_{1,m} - \tau_o)$$

$$= \frac{1}{c}\sqrt{(x_{2,k} - x)^2 + (y_{2,k} - y)^2} -$$

$$\frac{1}{c}\sqrt{(x_{1,m} - x)^2 + (y_{1,m} - y)^2}$$

where c is the speed of propagation, $(x_{1,m}, y_{1,m}, z_{1,m})$ are the coordinates of the $m^{th}$ antenna at $MS_1$, $(x_{2,k}, y_{2,k}, z_{2,k})$ are the coordinates of the $k^{th}$ antenna at $MS_2$, and (x,y) are the coordinates of the CT (502). This is achieved using TDOA-based Hyperbolic Multi-lateration (as shown in Turin, G. L. et al., "A Statistical Model of Urban Multipath Propagation," *IEEE Transactions on Vehicular Technology*, Vol. VT-21, No. 1, February 1972, and as shown in Smith, J. O. et al., "Closed-Form Least-Squares Source Location Estimation from Range-Difference Measurements," *IEEE Transactions on Acoustics, Speech, and Signal Processing*, Vol. ASSP-35, No. 12, December, 1987). In the case where the three-dimensional coordinates of the CT are required, we have to solve for (x,y,z) using $$TDOA_{2,1,k,m} = \tau_{2,k} - \tau_{1,m} \quad (2)$$

$$= (\tau_{2,k} - \tau_o) - (\tau_{1,m} - \tau_o)$$

$$= \frac{1}{c}\sqrt{(x_{2,k} - x)^2 + (y_{2,k} - y)^2 + (z_{2,k} - z)^2} -$$

$$\frac{1}{c}\sqrt{(x_{1,m} - x)^2 + (y_{1,m} - y)^2 + (z_{1,m} - z)^2}$$

Figure 6:
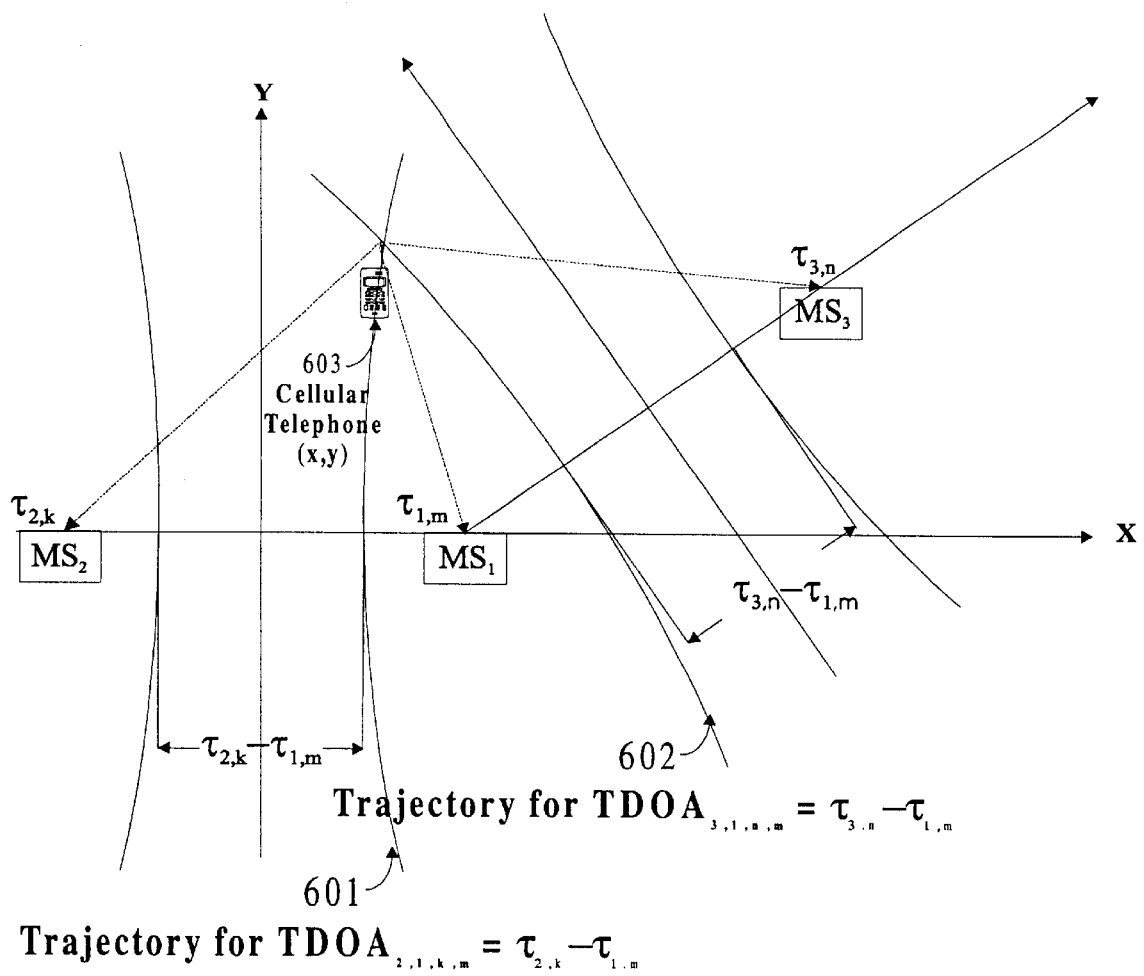

Without loss of generality, FIG. 6 illustrates the two intersecting Trajectories for the two-dimensional coordinates (x,y) of the CT (603) based on $TDOA_{2,1,k,m}$ (601) and $TDOA_{3,1,n,m}$ (602). In other words, it is possible to solve for (x,y) as the intersection between the two trajectories obtained using three Times of Arrival (TOAs) (after choosing the correct side of each hyperbola). In order to solve for (x,y,z) we require four TOAs.

Figure 7:
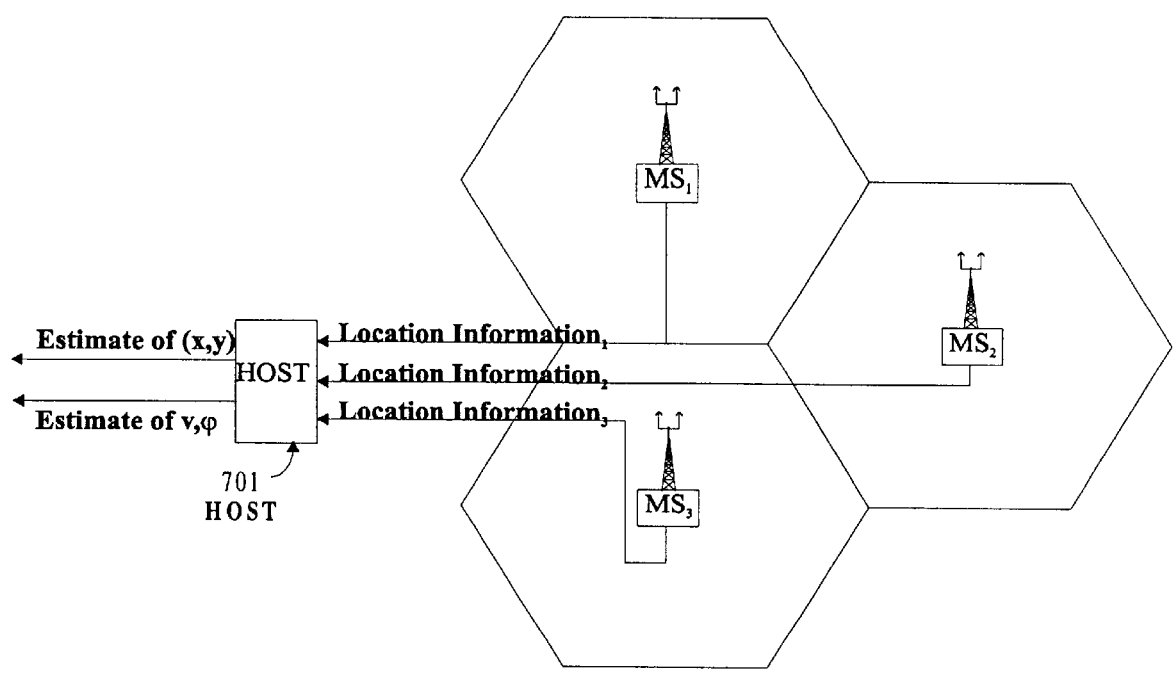

FIG. 7 illustrates the Second Stage of the Wireless location system where the $i^{th}$ MS down-loads its positional information to a central processor which we refer to as the Host (701). The Host uses all the positional information to estimate the coordinates (x,y) of the CT and its speed v and DOT $\phi$. Without loss of generality, FIG. 7 assumes that each MS has two antennas.

Figure 8:
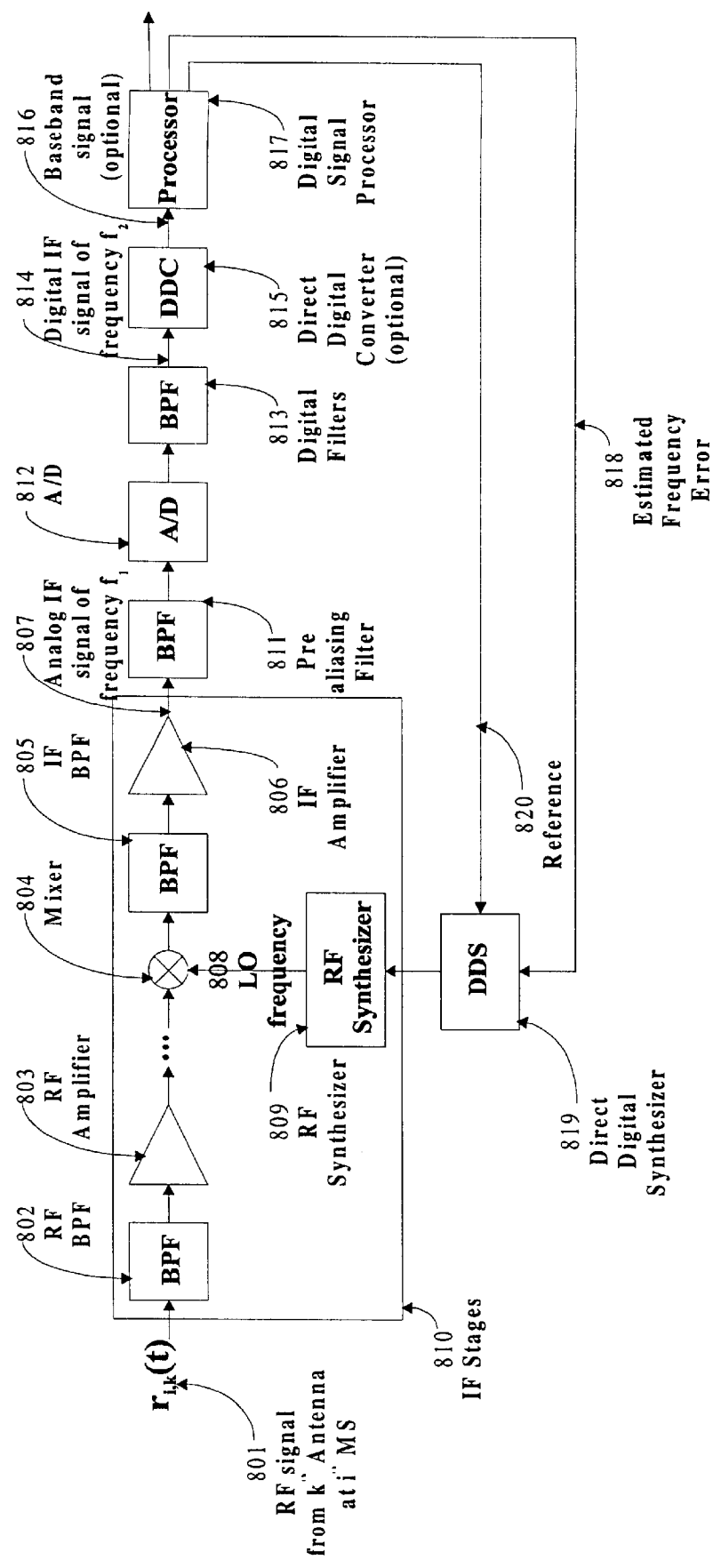
Figure 9A:
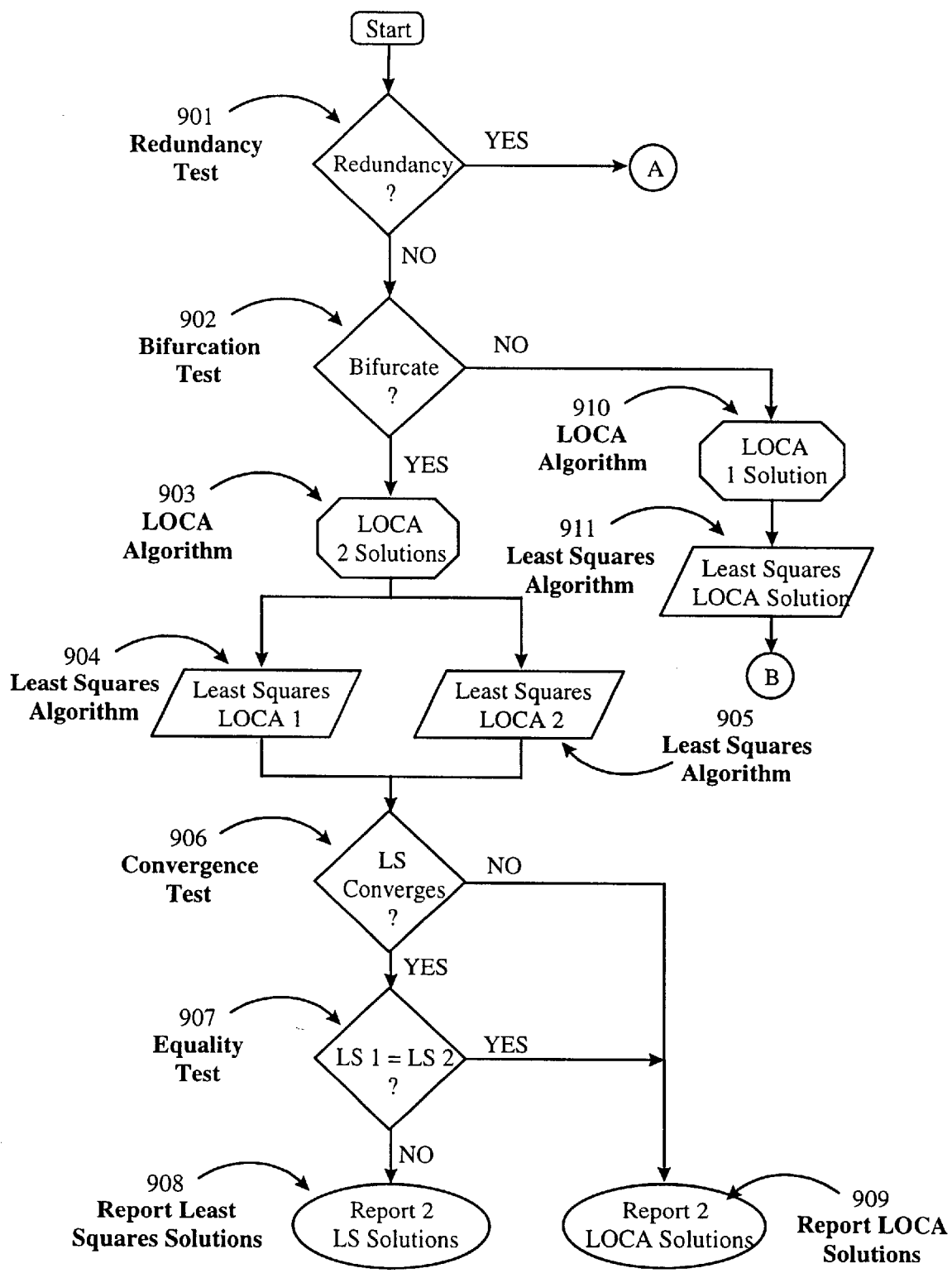
Figure 9B:
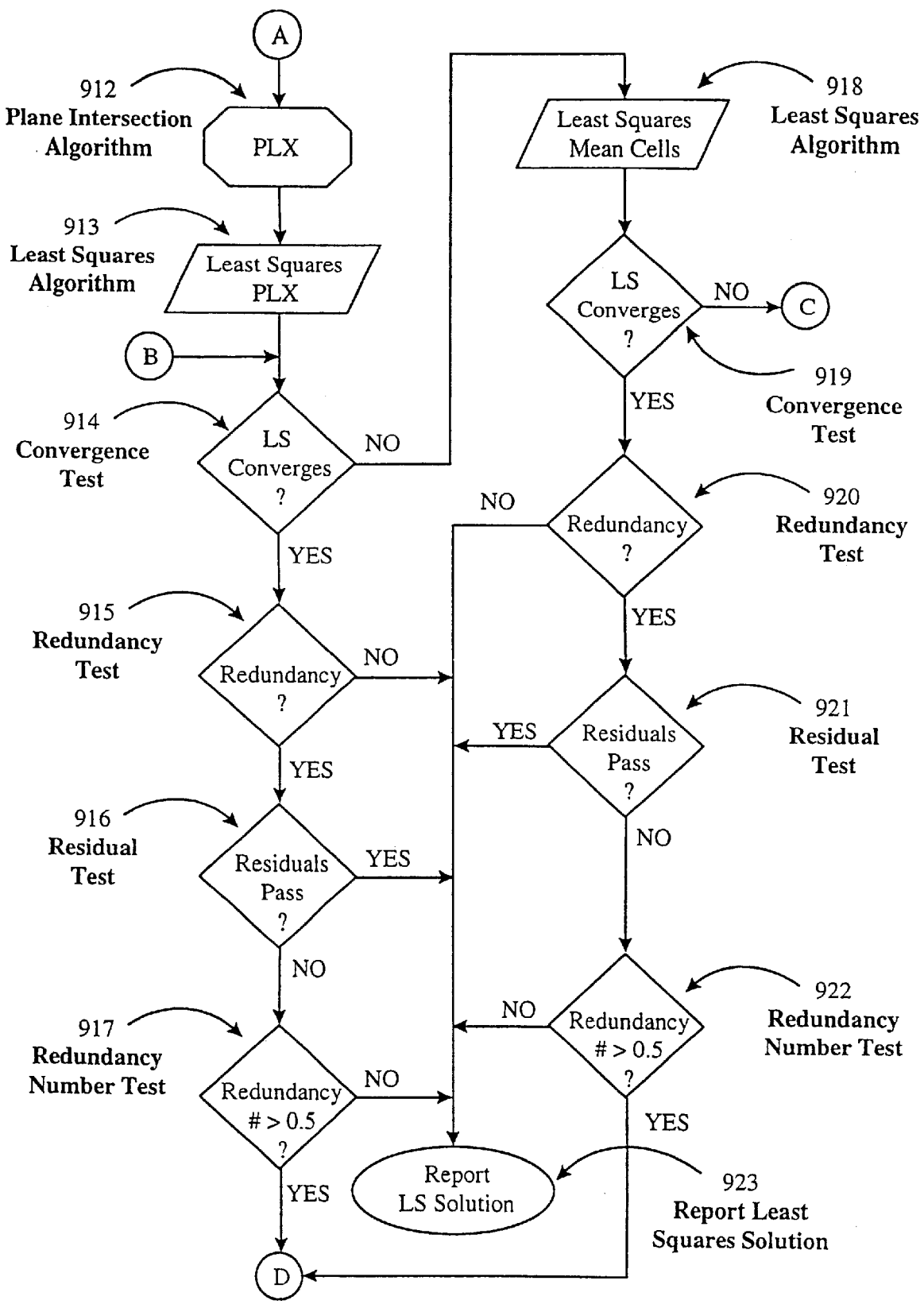
Figure 9C:
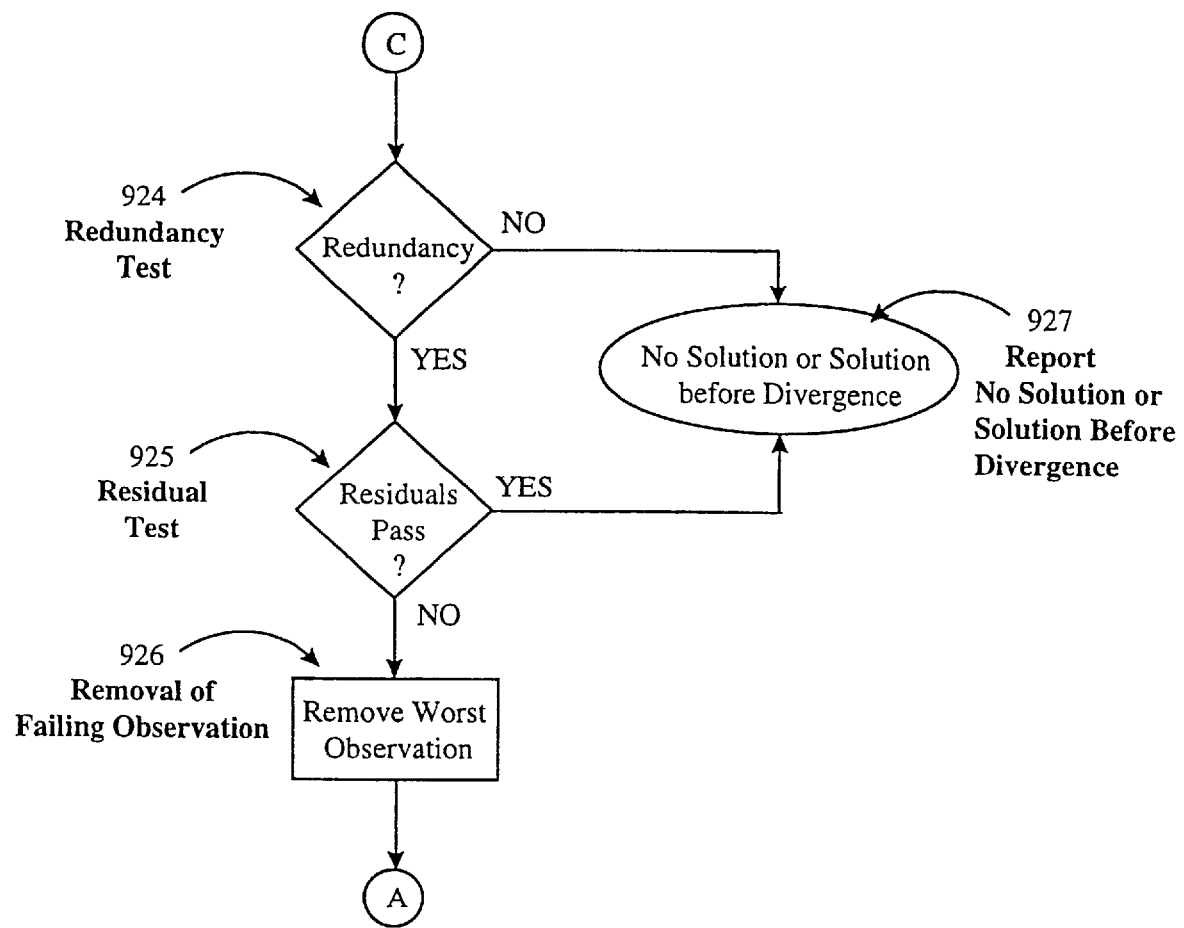
Figure 9D:
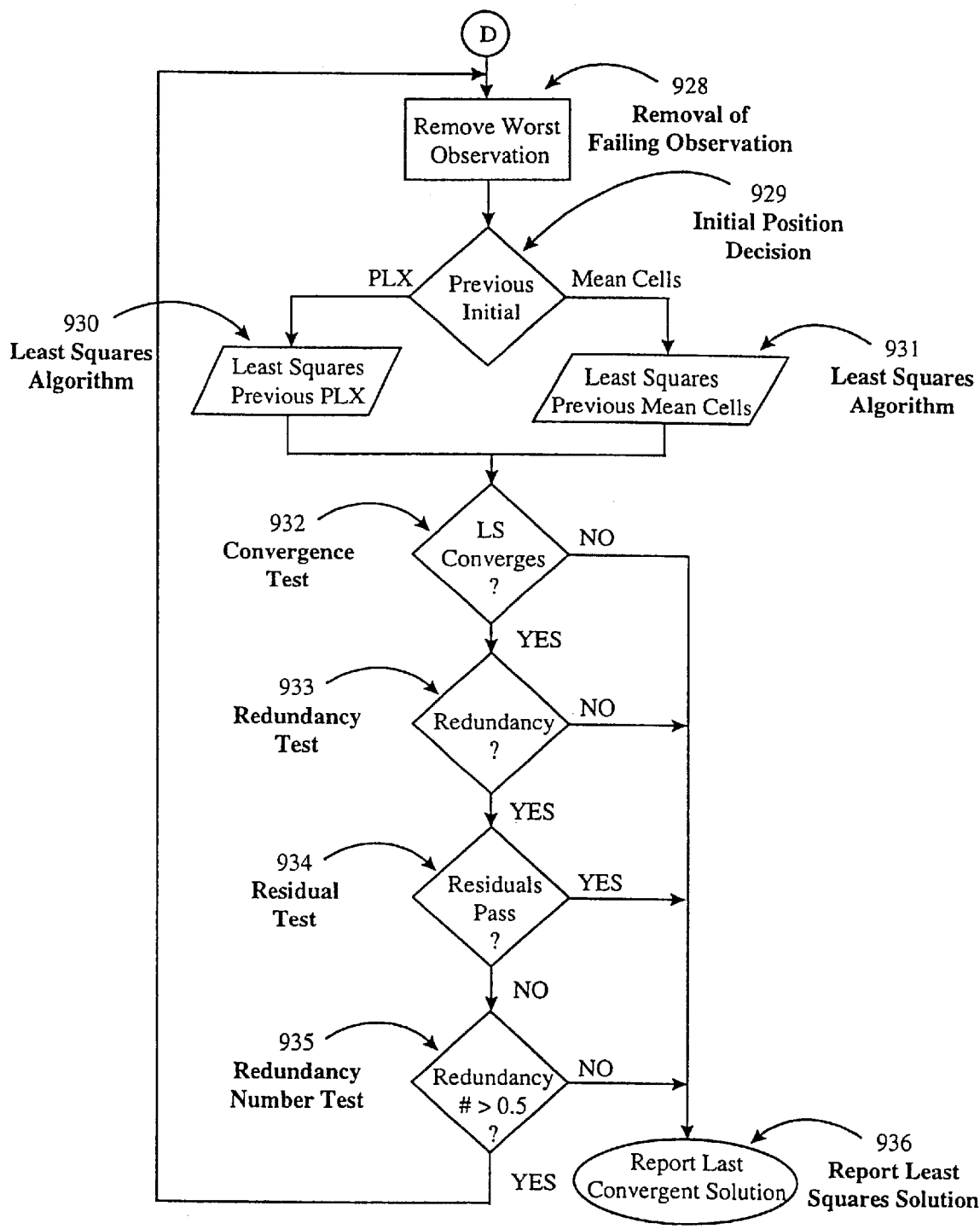

FIG. 8 illustrates the description of Design I for the IF-sampling receiver. The received RF signal $r_{i,k}(t)$ at the $k^{th}$ antenna of the $i^{th}$ MS is initially filtered by an RF Band Pass Filter (BPF) (802), amplified by an RF amplifier (803), down-converted by several Intermediate Frequency (IF) stages (810). Each IF stage consists of a mixer (804) with an LO (808) generated using an RF synthesizer (809), an IF BPF (805) and an IF amplifier (806). After the IF stages, the resulting analog IF signal (807) of IF frequency $f_1$ is filtered by a pre-aliasing filter (811), sampled by an A/D (812) and filtered again using digital filters (813) in order to generate a digital IF signal (814) of frequency $f_2$, where $f_2 < f_1$. An optional Direct Digital Converter (DDC) (815) is used to down-convert the digital IF signal (814) to Baseband. The resulting signal is then processed by a Digital Signal Processor (DSP) (817) in order to estimate the Frequency Of Arrival (FOA) of the received signal, $r_{i,k}(t)$. A function of the estimated FOA is fed-back to a Direct Digital Synthesizer (DDS) (819) which controls the RF synthesizer (809). The DSP (817) also provides a reference signal (820) to the DDS (819). A preferred source for the reference signal (820) is one that is common to all MSs such as a GPS signal.

FIGS. 9a, 9b, 9c and 9d illustrate a flow diagram for the positioning strategy. The positioning strategy consists of a number of algorithms (Least Squares, Location On the Conic Axis (LOCA), Plane Intersection) and numerous decisions. Given a set of observations, there are 4 possible outcomes: two LS position solutions (908), two LOCA position solutions (909), one LS position solution (923, 936), and no position solution (927).

DEFINITIONS

The following definitions take precedence over definitions for the same terms that can be found in the open literature.

Cellular Telephone (CT): is a device, which can be portable or fixed, that is serviced by a wireless network. It can be a regular cellular telephone, a PCS (Personal Communication Systems) telephone, a cordless telephone, a Personal Digital Assistant (PDA) or a radio tag that does not contain the audio portion of the telephone. It can also be a transmitter that transmits periodically over a given channel.

Base Station (BS): is a transceiver that can service a number of CTs in a cell.

Sectorized cell: is a cell that is made of several non-overlapping sectors. Each sector can be considered as an independent cell to be serviced by an independent BS. However, sectors in a cell are usually serviced by the same BS in order to minimize cost and complexity. We refer to such a BS as having several sectors.

Monitoring Site (MS): is a receiver that has the ability to monitor all four channels: RECC, FOCC, RVC and FVC. It is appropriate to collocate the MS with the BS in order to take advantage of the existing cellular infrastructure. The patent however does not require such a collocation since the MS performs all reception tasks required by a BS.

Host: is a central processor to process all positional information that are received from the MSs and to transmit monitoring orders to all MSs. The host can also be responsible for location services such as fleet management, location sensitive billing, etc. The Host can also be responsible for software/firmware upgrades/re-configurations of the MSs.

Reverse Control Channel (RECC): is the channel to be used by the CT to to transmit a control signal to the BS such as call originations, registrations, etc.

Forward Control Channel (FOCC): is the channel to be used by the BS to transmit a control signal to the CT such as paging the CT, acknowledging a registration, etc.

Reverse Voice Channel (RVC): is the channel to be assigned by the BS and to be used by the CT to transmit a voice signal to the BS, during either "conversation" mode or "waiting for answer" mode.

Forward Voice Channel (FVC): is the channel corresponding to the assigned RVC channel and to be used by the BS to transmit a voice signal to the CT during either "conversation" mode or "waiting for answer" mode.

Originations: are defined as calls initiated by a CT.

Pages: are initiated by a BS to a CT.

Conversation mode: Originations made by the CT go to "conversation" mode after RVC channel assignment by the BS.

Unanswered conversation mode: is defined as an origination that is in conversation mode that has not been answered yet by the called party.

Answered conversation mode: is defined as an origination that is in conversation mode that has been answered by the called party.

Waiting for Answer mode: Pages go to "waiting for answer" mode after RVC channel assignment by the BS until answered by the CT.

Super-Resolution (SR) Aleorithm: is an operation that transforms a time domain signal, s(t), to a frequency domain signal, S(f), in such a way that the frequency domain signal, S(f), has better resolution than the resolution offered by the Fourier transform, i.e. S(f) has better resolution than the Fourier transform $\Im\{s(t)\}$, of s(t). Vice-versa, a SR algorithm transforms a frequency domain signal, S(f), to a time domain signal, s(t), with a higher resolution than the resolution offered by the inverse Fourier transform, i.e. s(t) has better resolution than the inverse Fourier transform $\Im^{-1}\{S(f)\}$, of S(f)). Examples of SR algorithms are well known in the literature and include:

MUSIC,

ESPRIT,

Auto Regressive Moving Average,

Minimum Variance,

MUSIC using Higher Order Statistics,

ESPRIT using Higher Order Statistics,

Auto Regressive Moving Average using Higher Order Statistics, or

Minimum Variance using Higher Order Statistics.

Rayleieh Resolution: is the resolution offered by the Fourier transform (or equivalently the inverse Fourier transform).

Inverse SR algorithm: is an algorithm which processes a time domain signal in order to improve its time resolution over the conventional Rayleigh resolution. A preferred embodiment of the inverse SR algorithm comprises a conventional time domain correlator, a time domain window, a Fourier Transform, a frequency domain window, a frequency domain equalizer, and a processor which performs a SR algorithm in order to resolve the TOAs in the received signal at a given MS.

Alternatively, an inverse SR algorithm can process a frequency domain signal in order to improve its frequency resolution over the conventional Rayleigh resolution. In this case, a preferred embodiment of the inverse SR algorithm comprises a frequency domain correlator, a frequency domain window, an inverse Fourier Transform, a time domain window, a time domain equalizer, and a processor which performs a SR algorithm in order to resolve the FOAs in the received signal at a given MS.

Diversity Antennas: are cellular antennas that exist in almost every BS. Diversity can be accomplished either using horizontal separation, vertical separation, or both. In this patent, we use the horizontally separated diversity antennas as a mean to estimate the horizontal Angle Of Arrival (AOA) of the received radio signal at a MS. When the diversity antennas are vertically separated, either the elevation AOA is estimated or the received signals from all antennas at a given MS are combined using:

selection combining, maximal ratio combining, co-phasing combining, equal gain combining, or other methods of combining.

Sector antennas: are cellular antennas that exist in some BS that service more than one sector. Each sector has a dedicated antenna (or set of antennas if diversity is applied).

Fourier Transform-Based Filters: are filters that:
1. Fourier Transform the time domain signal, then
2. window the transformed signal over a given band, and
3. Inverse Fourier Transform the windowed signal.

Effective Bandwidth: is the bandwidth over which the received radio signal at a given MS has been observed during a given observation interval.

OBJECTIVES OF THE INVENTION

It is the intention of the invention to produce a network-based Wireless Location System (WLS) whereby existing FDMA CTs can be located passively without modification to the CT or to the cellular antenna infrastructure.

More specifically, it is the intention of this patent to estimate the static and kinematic positional information of an FDMA CT which transmits a signal, s(t), at time $\tau_o$ by monitoring the corresponding received signal $r_{i,k}(t)$ at the $k^{th}$ antenna of the $i^{th}$ MS.

It is also the intention of the patent to correct for the sources of error that affect the different location technologies for an AMPs-CT in a unique and novel way. More specifically, we need to correct for frequency errors, clock offsets, overall group delays, multipath and interference. We also need to minimize the effect of the noise and reduce HDOP (Horizontal Dilution Of Precision).

Yet another contribution of this invention is the way the CT is forced to transmit radio signals for location purposes. For example, it is the intention of the patent to be able to locate a powered-up AMPs-CT in a passive manner by using the signal transmitted by the CT over the RECC channel or the RVC channel.

Yet another intention of the patent is to use the diversity antennas, or the sector antennas, or both to estimate the AOA of the CT to a MS.

Yet another intention of the patent is to use the entire RECC message for locating the CT without having to transfer all the raw data back to the host. This message can have a duration of up to 125 ms (i.e. 5 words+precursor=124.8 msec) which corresponds to a large amount of raw data.

Yet another intention of the patent is to use SR and Inverse SR algorithms over the entire RECC message for locating the CT in order to increase the resolution of the WLS over conventional methods.

Yet another intention of the patent is to locate an AMPs-CT that is initiating a call using the signal transmitted by the CT over the RVC channel as the CT remains in the "unanswered conversation" mode.

Yet another intention of the patent is to locate a powered-up AMPs-CT by using the signal transmitted by the CT over the RVC channel without incurring air time charges and while the CT remains in the "waiting for answer" mode.

Yet another intention of the patent is to locate an AMPs-CT by estimating the Phase Of Arrival (POA) of existing or generated tones either over the RECC channel or over the RVC channel. The phases can be extracted using SR algorithms in order to reduce the effect of multipath.

Yet another intention of the patent is to use the estimated POA to estimate either the TOA of the signal $r_{i,k}(t)$ or its AOA at the $k^{th}$ antenna of the $i^{th}$ MS using Phase Difference Of Arrival (PDOA).

Yet another intention of the patent is to estimate the Doppler shift ($\delta f_{i,k}$) at each MS in order to estimate the speed and Direction of Travel (DOT) of the CT using Frequency Difference Of Arrival (FDOA).

Theoretical Description of the Invention:

In a WLS, many factors affect the system performance:
1. RF shadowing and flat fading,
2. frequency offsets (including LOs drift and Doppler Shifts),
3. clock errors,
4. time delays,
5. noise,
6. multipath (selective fading),
7. interference;
8. geographical geometry of the MSs relative to the intended CT.

Each factor degrades the estimated location of the CT depending on the technology employed for extracting the independent equations required for location.

Figure 1:
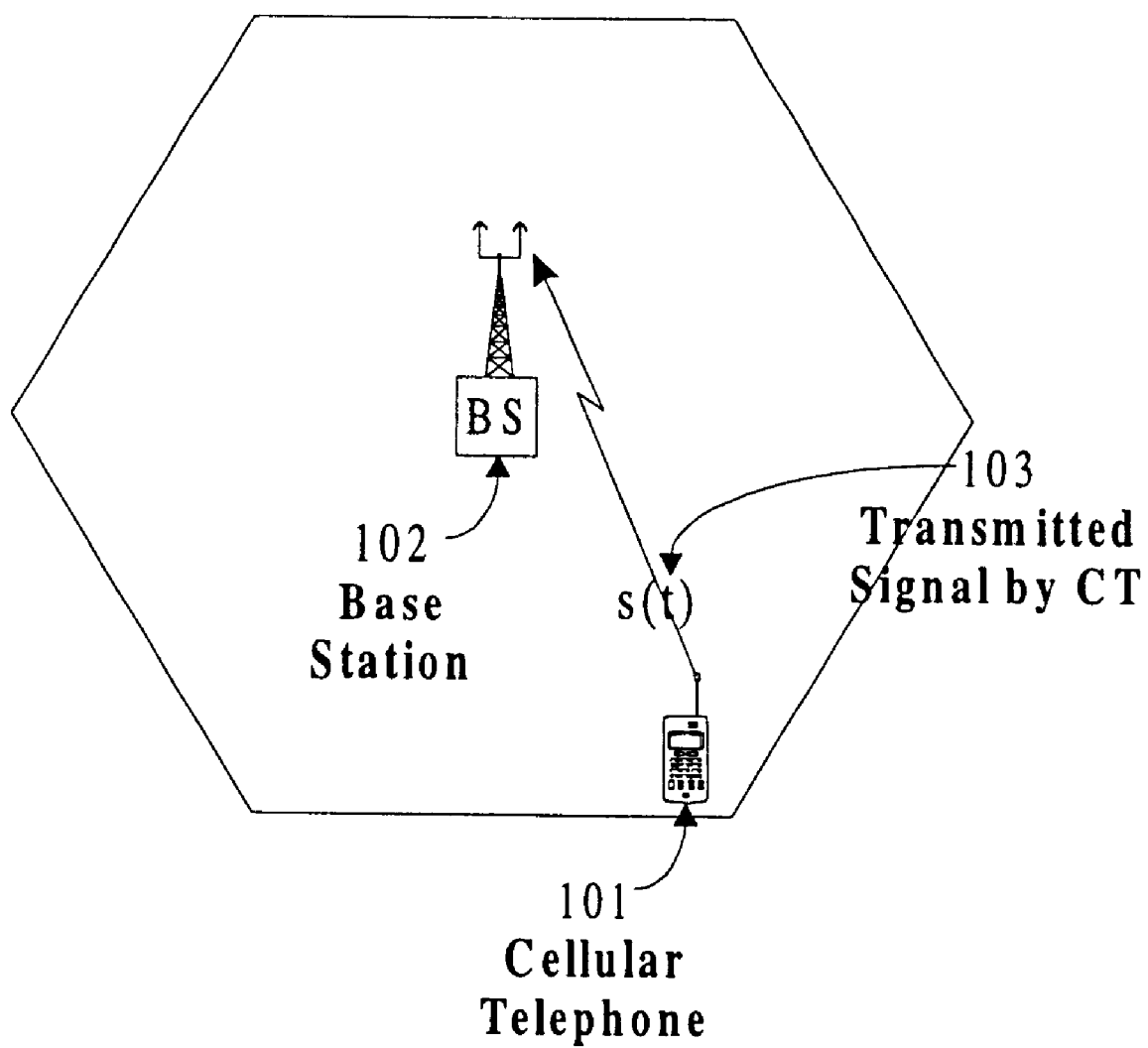
FIG. 1 illustrates the transmission by the CT (101) of a signal s(t) (103). When the CT is AMPs-based, it transmits a signal either over the RECC channel or over the RVC channel. In either case, the transmission is intended for the Base Station (BS) (102) with the most suitable Received Signal Strength Indicator (RSSI) at any one of its antennas. Without loss of generality, FIG. 1 assumes that the BS (102) has two antennas.

RF Transmission: More specifically, the Low Pass (LP) equivalent transmitted signal, $\tilde{s}(t)$, can be modeled as $$\tilde{s}(t)=e^{-j2\pi(f_c+\Delta f_o)\tau_o}e^{j(2\pi(f_c+\Delta f_o)t+\zeta_o)}p(t-\tau_o) \quad (3)$$

and the RF transmitted signal, $s(t)$, (see FIG. 1) can be expressed as $$s(t)=Re\{e^{j2\pi f_c t}\tilde{s}(t)\} \quad (4)$$

where

Re {.} denotes a real part operation;

$f_c$ is the carrier frequency, $\Delta f_o$ is the frequency offset from $f_c$ (usually unknown to the CT since it depends on the BS), $\tau_o$ is the time of transmission (also unknown to the MSs), $\zeta_o$ is the phase of the frequency $f_c+\Delta f_o$ (also unknown to the MSs), $j=\sqrt{-1}$ and $p(t)$ is a band-limited baseband signal.

RF Reception: Then, the LP equivalent received signal, $\tilde{r}_{i,k}(t)$, through the $k^{th}$ antenna at the $i^{th}$ MS can be modeled as $$\tilde{r}_{i,k}(t)=G_{i,k}R_{i,k}^{-n}e^{j(\theta_{i,k}+\zeta_o)}e^{j2\pi(\Delta f_o+\delta f_{i,k})t}p(t-\tau_{i,k}+\tau_o-\Delta t_{i,k})+w_{i,k}(t)+MP_{i,k}(t)+I_{i,k}(t) \quad (5)$$

and the RF received signal, $r_{i,k}(t)$, (see FIG. 2) can be expressed as $$r_{i,k}(t)=Re\{e^{j2\pi f_c t}\tilde{r}_{i,k}(t)\} \quad (6)$$

where

Re {.} denotes a real part operation;

$G_{i,k}$ represents the gain (real) due to the transmitting and receiving antennas from the CT to the $k^{th}$ antenna of the $i^{th}$ MS (a function of the two antenna patterns respectively), $R_{i,k}^{-n}$ represents the attenuation (real) due to the propagation channel, where n is a real number (usually between 2 and 4) that depends on the channel and $R_{i,k}$ is the range between the CT and the $k^{th}$ antenna of the $i^{th}$ MS, $$\theta_{i,k}=\{-2\pi(f_c+\Delta f_o+\delta f_{i,k})(\tau_{i,k}-\tau_o+\Delta t_{i,k})\}\bmod 2\pi \quad (7)$$

is the phase of the received RF signal at the $k^{th}$ antenna of the $i^{th}$ MS, where:

$\delta f_{i,k}$ is the frequency offset due to the Doppler shift over the propagation channel (a function of speed, v, and Direction Of Travel (DOT), $\phi$).

$\tau_{i,k}$ is the Time Of Arrival (TOA) of the signal $r_{i,k}(t)$ at the $k^{th}$ antenna of the $i^{th}$ MS (a function of the range $R_{i,k}$), $\Delta t_{i,k}$ is the overall group delay through the $k^{th}$ antenna of the $i^{th}$ MS (usually a function of frequency), $w_{i,k}(t)$ represents the Additive White Gaussian Noise (AWGN, complex) due to thermal noise at the $k^{th}$ antenna of the $i^{th}$ MS (a function of temperature and bandwidth), $MP_{i,k}(t)$ represents all multipath components (complex) at the $k^{th}$ antenna of the $i^{th}$ MS (a function of the environment and of the elevation of the antennas), and $I_{i,k}(t)$ represents interference (both in-band and out-of-band) at the $k^{th}$ antenna of the $i^{th}$ MS.

Baseband Reception: Several IF stages down-convert the received RF signal, $r_{i,k}(t)$, to an analog baseband signal, $\hat{r}_{i,k}(t)$, which is equivalent to performing the following operation:

$$\hat{r}_{i,k}(t)=Re\{e^{j2\pi f_c t}\tilde{r}_{i,k}(t)e^{-j2\pi(f_c+\Delta f_{i,k})t}e^{-j\zeta_{i,k}}\}=Re\{\tilde{r}_{i,k}(t)e^{-j2\pi\Delta f_{i,k}t}e^{-j\zeta_{i,k}}\} \quad (8)$$

where $\Delta f_{i,k}$ is the frequency error between the Local Oscillators (LOs) in the $k^{th}$ receiver at the $i^{th}$ MS and the carrier frequency $f_c$; and $\zeta_{i,k}$ is the carrier phase of the LOs in the $k^{th}$ receiver at the $i^{th}$ MS.

From equations (5), (6) and (8), one can refer to:

"$\psi_{i,k}=\theta_{i,k}-\zeta_{i,k}+\zeta_o$" as the Phase Of Arrival (POA) of the received signal, $\hat{r}_{i,k}(t)$; and "$f_{i,k}=\delta f_{i,k}-\Delta f_{i,k}+\Delta f_o$" as the Frequency Of Arrival (FOA) of the received signal, $\hat{r}_{i,k}(t)$.

Digital Reception: Finally, an Analog-to-Digital (A-to-D) Converter converts the baseband signal, $\hat{r}_{i,k}(t)$, to a digital signal, $\hat{r}_{i,k}(m)$, which is equivalent to performing the following operation:

$$\hat{r}_{i,k}(m)=\hat{r}_{i,k}(t)|_{t=m\Delta T_{i,k}}+q_{i,k}(m) \quad (9)$$

where $\Delta T_{i,k}$ is the sampling interval in the $k^{th}$ receiver at the $i^{th}$ MS;

m is an integer; and $q_{i,k}(m)$ is the quantization noise which depends on the number of bits in the A-to-D.

Sources of Location Information in Equation (5):

There are several sources of information where one can extract an independent equation from equation (5) regarding the static location of the CT, i.e. regarding the coordinates, (x,y), of the CT:

1. $R_{i,k}^{-n}$,

2. $\psi_{i,k}$, and

3. $p(t - \tau_{i,k} - \tau_o - \Delta t_{i,k})$.

2. $\psi_{i,k}$, and

3. $p(t-\tau_{i,k}-\tau_o-\Delta t_{i,k})$.

In addition, there is one source of information where one can extract an independent equation from equation (5) regarding the kinematic location of the CT, i.e. regarding the velocity, $\vec{v}$, namely:

4. $f_{i,k}$.

Starting with the static information, we have:

1. $R_{i,k}^{-n}$:

In the static case, the first source, $R_{i,k}^{-n}$, can be used to estimate $R_{i,k}$. However, $R_{i,k}^{-n}$ is unreliable due to the nature of the radio channel where RF shadowing and flat fading can deviate the value of "n" in "$R_{i,k}^{-n}$"

from 2 (for Line Of Sight (LOS)) to 4 (for an urban environment, as shown in Hata, M., "Empirical Formula for Radio Propagation Loss in Land Mobile Radio Services," *IEEE Transactions on Vehicular Technology*, Vol. VT-29, No. 3, August 1980), or even 6 in heavy urban environments. Hence, unless LOS is guaranteed between the CT and the $k^{th}$ antenna at the ith MS, $R_{i,k}^{-n}$ can only offer an accuracy of a few kilometers for $R_{i,k}$. In the case when LOS is guaranteed (e.g. in a flat environment such as in the sea or over a lake), $G_{i,k}$ has to be known to the $i^{th}$ MS and "n" can be chosen to be 2.

2. $\psi_{i,k}$: The second source, the POA $$\psi_{i,k}=\{-2\pi(f_c+\Delta f_o+\delta f_{i,k})(\tau_{i,k}-\tau_o+\Delta t_{i,k})+\Delta\zeta_{i,k}\} \bmod 2\pi \quad (10)$$

can be used to estimate the TOA, $\tau_{i,k}$, where $\Delta\zeta_{i,k}$ is defined as $\zeta_o-\zeta_{i,k}$. The POA, $\psi_{i,k}$, is related to the range, $R_{i,k}$, between the $k^{th}$ antenna at the $i^{th}$ BS, and the CT through equations (10) and (11):

$$R_{i,k}=(\tau_{i,k}-\tau_o)c \quad (11)$$

where c is the speed of propagation.

The time of transmission, $\tau_o$, in (11) is usually unknown to the MSs. One can either:

1. estimate it, then use the estimated value in TOA positioning, or 2. remove it using TDOA positioning.

Both TOA and TDOA positioning are explained later in the patent.

In TOA positioning, a possible method to estimate $\tau_o$ is to estimate the Round Trip Delay (RTD) between:

the transmission from an active BS to a CT and the response of the CT to the transmission of the active BS; instead. In this case, $$2R_{i,k}=(2\tau_{i,k}-\tau_{BS})c \quad (12)$$

where $\tau_{BS}$ is the time of transmission from the BS to the CT CT and $2\tau_{i,k}$ is the TOA of the response of the CT to the BS. Furthermore, in TOA positioning, a drawback in using $\psi_{i,k}$ in equation (10) to estimate $\tau_{i,k}$ is the "mod $2\pi$" operation in (10) which implies that there can be a large integer ambiguity in the TOA estimation.

In TDOA positioning, a pair of TOAs, $\tau_{i,k}$ and $\tau_{j,m}$, is needed per independent equation. In this case, the amount of the ambiguity is a function of the baseline between the two receiving antennas, i.e. between the $k^{th}$ antenna in the $i^{th}$ MS and the $m^{th}$ antenna in the $j^{th}$ MS with respect to the wavelength corresponding to the frequency: $f_c+\Delta f_o+\delta f_{i,k}$ in (10), as shown in equation (13):

$$\tau_{i,k}-\tau_{j,m}=-\{(\psi_{i,k}-\psi_{j,m})-(\Delta\zeta_{i,k}-\Delta\zeta_{j,m})+2\pi n\}/2\pi f_c-(\Delta t_{i,k}-\Delta t_{j,m})+\text{extra term} \quad (13)$$

where $\tau_{i,k}$ corresponds to the TOA at the $k^{th}$ antenna of the $i^{th}$ MS;

$\tau_{j,m}$ corresponds to the TOA at the $m^{th}$ antenna of the $j^{th}$ MS;

n is the integer ambiguity; and the extra term in (13) is due to the existence of $\Delta f_o$ in (10) which depends on the error in the CT LOs relative to $f_c$; and to $\delta f_{i,k}$ in (10) which depends on the velocity $\vec{v}$ of the CT and the wavelength $\lambda$ corresponding to $f_c$.

In AMPs standard, the CT frequency, $f_c+\Delta f_o$, can deviate by up to 2.5 part per million (i.e. by up to 2.5 KHz). Furthermore, in cellular telephony in North America, the carrier frequency, $f_c$, can take values around 800 MHz (with a wavelength $\lambda$ of around 37.5 cm) or values around 1.9 GHz (with a wavelength $\lambda$ of around 15.8 cm). This implies that for a velocity of 100 km/hr $\delta f_{i,k}$ corresponds to:

$-75$ Hz$>\delta f_{i,k}>75$ Hz for $f_c=800$ Mhz, or to $-150$ Hz$>\delta f_{i,k}>150$ Hz for $f_c=1.9$ GHz.

In conclusion:

1. $f_c>>\delta f_{i,k}$ and $f_c>>\Delta f_o$, i.e. the extra term in (13) is negligible; and 2. the amount of ambiguity in (13) can be potentially large unless the baseline between the two receiving antennas is small with respect to the wavelength, $\lambda$, corresponding to the frequency: $f_c$. We refer to such a solution as Solution I.

Solution I: When the baseline between the $k^{th}$ antenna at the $i^{th}$ MS and the $m^{th}$ antenna at the $j^{th}$ MS is small relative to the wavelength, $\lambda$, we assume without loss of generality that the two antennas belong to the same MS (which can be achieved using cellular diversity antennas, cellular sector antennas, or any other type of antennas, at the same BS, when the MS is collocated with a BS). In this case, it is possible to generate a solution using either TDOA or PDOA. The TDOA solution between the two antennas is a hyperbola while the PDOA solution between the two antennas is a line. Both solutions approximate the exact solution and coincide asymptotically, i.e. the PDOA line and the TDOA hyperbola coincide at infinity.

For simplicity of notation, we assume that:

the $k^{th}$ antenna at the $i^{th}$ MS is antenna$_1$, while the $m^{th}$ antenna also at the $i^{th}$ MS is antenna$_2$.

In this patent, we further assume that the CT is far from the $i^{th}$ MS with respect to the baseline, $d_{i,1,2}$, between antenna$_1$ and antenna$_2$. Such an assumption implies that:

1. the received wavefront is planar, i.e. $\gamma_{i,1}=\gamma_{i,2}=\gamma_i$, where:
   $\gamma_{i,1}$ is the Angle Of Arrival (AOA) of $r_{i,1}(t)$ at antenna$_1$,
   $\gamma_{i,2}$ is the AOA of $r_{i,2}(t)$ at antenna$_2$, and
   $\gamma_i$ is defined as the angle formed between:
      the line joining the CT (301) and the $i^{th}$ MS and,
      the line joining the two antennas at the $i^{th}$ MS;
   in a clockwise manner from the line formed by the CT and the $i^{th}$ MS to the line between the two antennas.

2. the following equation relates the Phase Difference of Arrival (PDOA), $(\psi_{i,1}-\psi_{i,2})$, to the angle $\gamma_i$:

$$\frac{2\pi d_{i,1,2}}{\lambda}\cos(\gamma_i) = (\psi_{i,1} - \psi_{i,2}) \bmod 2\pi \quad (14)$$

where:
$\psi_{i,1}$ is the Phase Of Arrival (POA) of $r_{i,1}(t)$ at antenna$_1$; and
$\psi_{i,2}$ is the POA of $r_{i,2}(t)$ at antenna$_2$.

The solution for $\gamma_i$ in (14) is $$\gamma_i = \pm\cos^{-1}\left\{\frac{\lambda}{2\pi d_{i,1,2}}(\psi_{i,1} - \psi_{i,2} + 2\pi k)\right\} \quad (15)$$

where k in (15) is an integer that has to satisfy the following condition:

$$-1 \le \frac{\lambda}{d_{i,1,2}}\left\{\frac{(\psi_{i,1} - \psi_{i,2}) \bmod 2\pi}{2\pi} + k\right\} \le 1 \quad (16)$$

For example, when $d_{i,1,2}=\lambda$, we have the following possible solutions for k:

when $\frac{(\psi_{i,1} - \psi_{i,2}) \bmod 2\pi}{2\pi} = -1,$ (17)

we have $k = 0, 1$ or $2$;

when $\frac{(\psi_{i,1} - \psi_{i,2}) \bmod 2\pi}{2\pi} = +1,$ we have $k = 0, -1$ or $-2$;

when $\frac{(\psi_{i,1} - \psi_{i,2}) \bmod 2\pi}{2\pi} = -1/2,$ we have $k = 0$ or $1$;

when $\frac{(\psi_{i,1} - \psi_{i,2}) \bmod 2\pi}{2\pi} = +1/2,$ we have $k = 0$ or $-1$;

when $\frac{(\psi_{i,1} - \psi_{i,2}) \bmod 2\pi}{2\pi} = 0,$ we have $k = 0, 1$ or $-1$;

Some of the solutions in (17) are trivial. As $d_{i,1,2}$ becomes larger than $\lambda$, we have more nontrivial solutions. Even though having more than one solution implies ambiguity, it is possible to resolve the ambiguity using Least-Squares Techniques as explained later. This is unique to the patent.

In processing $\psi_{i,k}$ to estimate either $\tau_{i,k}$ or $\gamma_i$, we have the following sources of errors:

The effect of noises $w_{i,k}(t)$, on $\gamma_i$: When using a linear array of antennas to estimate the AOA of an RF signal approximated as a planar wavefront (i.e. assuming a distant RF source), the Cramer-Rao Lower Bound on the variance, $\text{var}(\hat{\gamma}_i)$, of the estimated AOA, $\hat{\gamma}_i$, is equal to $$\text{var}(\hat{\gamma}_i)|_{Tone} \ge \frac{12c^2}{SNR_{i,k}|_{Tone} \times 4\pi^2 \times M \times (M^2 - 1) \times d^2 \times \sin^2\gamma_i \times f_m^2} \quad (18)$$

where
$\text{var}(\hat{\gamma}_i)|_{Tone}$ is the variance of the estimate $\hat{\gamma}_i$ of the bearing $\gamma_i$
$SNR_{i,k}|_{Tone}=A_{i,k}^2/(2\sigma_n^2)$,
$A_{i,k}$ is the amplitude of the tone
$\sigma_n^2$ n is the noise variance,
M is the number of elements in the antenna array,
d is the distance between antenna elements,
$f_m$ is the frequency of the tone, and
c is the speed of light.

The effect of noise, $w_{i,k}(t)$ on $\psi_{i,k}$: The Cramer-Rao Lower Bound provides a lower bound on the effect of AWGN on the variance, $\text{var}(\hat{\psi}_{i,k})|_{Tone}$, of the estimate, $\hat{\psi}_{i,k}$, of the phase $\psi_{i,k}$ for a tone of frequency $f_m$:

$$\text{var}(\hat{R}_{i,k})|_{Tone} = \left(\frac{\lambda}{2\pi}\right)^2 \text{var}(\hat{\psi}_{i,k})|_{Tone} \ge \frac{c^2}{SNR_{ik}|_{Tone} \times N_{i,k} \times 4\pi^2 f_m^2} \quad (19)$$

where
$\text{var}(\hat{R}_{i,k})|_{Tone}$ is the variance of the estimate, $\hat{R}_{i,k}$, of the range $R_{i,k}$,
$\lambda$ is the wavelength of the tone,
$f_m$ is the frequency of the tone corresponding to $\lambda$ (i.e. $f_m = c/\lambda$),
$SNR_{i,k}|_{Tone}=A_{i,k}^2/(2\sigma_n^2)$ where $SNR_{i,k}$ is the Signal-to-Noise Ratio at the $k^{th}$ antenna of the $i^{th}$ MS,
$A_{i,k}$ is the amplitude of the tone at the $k^{th}$ antenna of the $i^{th}$ MS,
$\sigma_n^2$ is the noise variance,
$N_{i,k}$ is the number of samples (which is directly related to the observation interval $T_{i,k}$ through $T_{i,k}=N_{i,k}/f_s$ where $f_s$ is the sampling frequency),
c is the speed of propagation.

Phase offsets: The phase of the tone $f_m$ is shifted by $\Delta\zeta_{i,k}$. In other words, $\Delta\zeta_{i,k}$ has to be estimated otherwise the phase $\psi_{i,k}$ is distorted.

time delays, $\Delta t_{i,k}$: The propagation delay $\tau_{i,k}$ is affected by $\Delta t_{i,k}$ which represents the system delay through the antenna, cables, filters, amplifiers, etc. $\Delta t_{i,k}$ has to be estimated otherwise the propagation delay can be prolonged significantly.

multipath, $MP_{i,k}(t)$: In TDOA, the multipath $MP_{i,k}(t)$ is equivalent to extra delay over the propagation channel and has to be either estimated and removed, or mitigated. In the case where the phase estimate is used to solve for the AOA of the received signal $r_{i,k}(t)$, the effect of multipath is to shift the AOA of $r_{i,k}(t)$ by some amount depending on the AOA of $MP_{i,k}(t)$ and its magnitude.

interference, $I_{i,k}(t)$: Depending on the level of interference, $I_{i,k}(t)$ can have a drastic effect on the accuracy of the estimated phase and may saturate the RF front end of the receiver. Its effects can be mitigated with both analog and digital hardware, as well as adequate software, whether it is in-band or out-of-band.

The practical description of the patent will describe methods and apparatus to estimate $\psi_{i,k}$ and to mitigate its sources of errors.

3. $p(t-\tau_{i,k}-\tau_o-\Delta t_{i,k})$: The last (and most common) source of information one can use to extract an independent equation for the static location of the CT is $$p(t-\tau_{i,k}-\tau_o-\Delta t_{i,k}) \quad (20)$$

which can be used to estimate either $\tau_{i,k}$ or $\gamma_{i,k}$:

When $\tau_{i,k}$ is estimated directly we refer to the solution as Solution II. In this case, either TOA positioning or TDOA positioning can be used. In TOA positioning, the time of transmission, $\tau_o$, from the CT has to be estimated. A possible method is to estimate the RTD between the BS transmission and the reception of the CT response as shown in equation (12). In TDOA positioning, the time of transmission, $\tau_o$, is removed using an extra independent equation.

When $\gamma_{i,k}$ is estimated from $\tau_{i,k}$, we refer to the solution as Solution III. In this case, AOA positioning is used.

When $\tau_{i,k}$ is estimated indirectly based on the phases of tones in $p(t-\tau_{i,k}-\tau_o-\Delta t_{i,k})$, we refer to the solution as Solution IV. Once again, either TOA positioning or TDOA positioning can be used as discussed above.

Solution II: The most common method for estimating $\tau_{i,k}$ is to cross-correlate $p(t-\tau_{i,k}-\tau_o-\Delta t_{i,k})$ with $p(t)$ (i.e. to cross-correlate $r_{i,k}(t)$ with $p(t)$). Equivalently, one can estimate the TDOA, $\tau_{i,k}-\tau_{j,m}$, between $\tau_{i,k}$ at the $k^{th}$ antenna of the $i^{th}$ MS and $\tau_{j,m}$ at the $m^{th}$ antenna of the $j^{th}$ MS by cross-correlating: $p(t-\tau_{i,k}-\tau_o-\Delta t_{i,k})$ with $p(t-\tau_{j,m}-\tau_o-\Delta t_{j,m})$, i.e. to cross-correlate $r_{i,k}(t)$ with $r_{j,m}(t)$. When the $i^{th}$ MS and the $j^{th}$ MS do not exist in the same location, one has to transfer both $r_{i,k}(t)$ and $r_{j,m}(t)$ to the same location. This can be costly and time consuming depending on the size and bit resolution of $r_{i,k}(t)$ and $r_{j,m}(t)$. Moreover, both $p(t-\tau_{i,k}-\tau_o-\Delta t_{i,k})$ and $p(t-\tau_{j,m}-\tau_o-\Delta t_{j,m})$ are obtained from $r_{i,k}(t)$ and $r_{j,m}(t)$ respectively, i.e. they are both noisy. A more efficient and less noisy method is to cross-correlate $p(t-\tau_{i,k}-\tau_o-\Delta t_{i,k})$ with $p(t)$ at the $i^{th}$ MS, as mentioned above, then transfer the estimated value of $\tau_{i,k}$ to the host. In this case, $p(t)$ has to be known at the $i^{th}$ and $j^{th}$ MSs which places a constraint on $p(t)$.

Solution III: In order to estimate $\gamma_{ij}$ from the TDOA solution, $\tau_{i,k}-\tau_{j,m}$, the patent assumes that the CT is far from both the $k^{th}$ antenna at the $i^{th}$ MS and the $m^{th}$ antenna at the $j^{th}$ MS with respect to their baseline, $d_{i,j,k,m}$. As mentioned previously, such an assumption practically implies that:

1. Both antennas exist at the same MS.
2. The received wavefront is planar, i.e. $\gamma_{i,1}=\gamma_{i,2}=\gamma_i$, where $\gamma_{i,1}$ is the Angle Of Arrival (AOA), at antenna$_1$ of the $i^{th}$ MS, $\gamma_{i,2}$ is the AOA at antenna$_2$ of the $i^{th}$ MS, and $\gamma_i$ is defined as the angle formed between:
- the line joining the CT (301) and the $i^{th}$ MS and,
- the line joining the two antennas at the $i^{th}$ MS
in a clockwise manner from the line formed by the CT and the $i^{th}$ MS to the line between the two antennas.

3. Equation (21) relates the angle $\gamma_i$ to the Time Difference of Arrival (TDOA), $\tau_{i,1}-\tau_{i,2}$, as follows $$\frac{d_{i,1,2}}{c}\cos(\gamma_i) = \tau_{i,1} - \tau_{i,2} \quad (21)$$

where $d_{i,1,2}$ is the distance between the first antenna at the $i^{th}$ MS and the second antenna at the $i^{th}$ MS; and c is the speed of propagation.

The advantage in estimating the AOA, $\gamma_i$, using $p(t-\tau_{i,k}-\tau_o-\Delta t_{i,k})$ in equation (20) from equation (22):

$$\gamma_i = \pm\cos^{-1}\left\{\frac{c}{d_{i,1,2}}(\tau_{i,1} - \tau_{i,2})\right\} \quad (22)$$

instead of using $\psi_{i,k}$ in (10) from equation (23):

$$\gamma_i = \pm\cos^{-1}\left\{\frac{\lambda}{2\pi d_{i,1,2}}(\psi_{i,1} - \psi_{i,2} + 2\pi k)\right\} \quad (23)$$

is the fact that there are no ambiguities in equation (22) except for the $\pm$ in the solution of $\gamma_i$, while equation (23) can have a number of ambiguities depending on the value of the integer k.

The disadvantages in estimating the AOA $\gamma_i$ using $p(t-\tau_{i,k}-\tau_o-\Delta t_{i,k})$ in equation (20) instead of using $\theta_{i,k}$ in (7) are:

1. a small baseline is required between the two antennas; and
2. the noise affects the variance, $\text{var}(\hat{\tau}_{i,k})|_{p(t)}$, of $\hat{\tau}_{i,k}$ more substantially than it affects the variance, $\text{var}(\hat{\psi}_{i,k})$, of $\hat{\psi}_{i,k}$.

The second disadvantage can be explained by comparing the Cramer-Rao Lower Bound for $\hat{\psi}_{i,k}$:

$$\left(\frac{\lambda}{2\pi}\right)^2 \text{var}(\hat{\psi}_{i,k})\bigg|_{Tone} \geq \frac{c^2}{SNR_{i,k}|_{Tone} \times N_{i,k} \times 4\pi^2 f_m^2} \quad (24)$$

with the CRLB for $\hat{\tau}_{i,k}$:

$$c^2\text{var}(\hat{\tau}_{i,k})|_{p(t)} \geq \frac{c^2}{SNR_{i,k}|_{p(t)} \times 4\pi^2 BW^2} \quad (25)$$

Assuming that $SNR_{i,k}|_{Tone} \times N_{i,k}$ in (24) is equal to $SNR_{i,k}|_{p(t)}$ in (25), then the difference between (24) and (25) is $f_m^2$ in (24) compared to $BW^2$ in (25). In AMPs the BW is approximately equal to 30 KHz while $f_m$ can be equal to the carrier frequency $f_c$ which is equal to 800 MHz. The ratio between the two values in dB is 88.52 dB. This is a very large difference. Nonetheless, $p(t-\tau_{i,k}-\tau_o-\Delta t_{i,k})$ in (20) is suitable for TDOA positioning while $\psi_{i,k}$ in (10) is suitable for AOA positioning as explained here:

Using $\psi_{i,k}$ in (10) to estimate the AOA, $\gamma_i$, we have a lower-bound of $5\times10^{-5}$ radians$^2$ for a SNR, $SNR_{i,k}|_{Tone} \times N_{i,k}$, of 30 dB. This is equivalent to having a standard deviation for $\hat{\gamma}_i$ of $7.07 \times 10^{-3}$ radians, which corresponds to a range error of 7.11 meters for every kilometer range between the CT and the antennas.

On the other hand, $p(t-\tau_{i,k}-\tau_o-\Delta t_{i,k})$ in (20) is suitable for TDOA positioning since in this case the baseline between antennas does not have to be small. For example, assuming the SNR, $SNR_{i,k}|_{p(t)}$, in equation (25) to be 30 dB, the lower-bound on the variance, $\text{var}(\hat{R}_{i,k})|_{p(t)} = c^2 \text{var}(\hat{\tau}_{i,k})|_{p(t)}$, of the range $R_{i,k}$ is 2553 meters$^2$ or equivalently $\hat{R}_{i,k}$ has a standard deviation of 50.53 meters.

Solution IV: When $\tau_{i,k}$ is estimated indirectly based on the phases of tones in $p(t-\tau_{i,k}-\tau_o-\Delta t_{i,k})$, an integer ambiguity can still exist in the solution unless the wavelength of the selected tones is large with respect to the range between the CT and the k$^{th}$ antenna at the i$^{th}$ MS. The selected tones are discussed below where a solution for the integer ambiguity is presented.

In processing $p(t-\tau_{i,k}-\tau_o-\Delta t_{i,k})$ to estimate $\tau_{i,k}$, we have the following sources of errors:

noises $w_i(t)$: The Cramer-Rao Lower Bound provides a lower bound on the effect of AWGN on the variance, $\text{var}(\hat{\tau}_{i,k})|_{p(t)}$, of the estimate of the delay $\tau_{i,k}$:

$$\text{var}(\hat{R}_{i,k})|_{p(t)} = c^2 \text{var}(\hat{\tau}_{i,k})|_{p(t)} \geq \frac{c^2}{SNR_{i,k}|_{p(t)} \times 4\pi^2 BW^2} \quad (26)$$

where
$\text{var}(\hat{R}_{i,k})|_{p(t)}$ is the variance of the estimate, $\hat{R}_{i,k}$, of the range $R_{i,k}$
BW is the RMS bandwidth of p(t),
$SNR_{i,k}|_{p(t)} = 2E_{i,k}/N_o$,
$E_{i,k}$ is the energy of $r_{i,k}(t)$,
$N_o$ is the noise Power Spectral Density, and
c is the speed of light.

The effect of Bandwidth, BW:

Equation (26) demonstrates that the bandwidth of the signal plays an important role in the accuracy of the wireless location system. In AMPs, the radio frequency (RF) channels are spaced by 30 KHz which is a relatively small BW compared to systems designed primarily for location such as Global Positioning Systems (GPS) with a BW of 1 MHz over Standard Positioning Services (SPS) channels and ISM-based location systems with a typical bandwidth of 10 MHz. In GPS, the location system initially uses a conventional sliding correlator to obtain a set of pseudo-ranges (one pseudo-range per satellite) (see e.g. Spilker, J. J., "GPS Signal Structure and Performance Characteristics," *Global Positioning System, Volume I*, The Institute of Navigation, Washington D.C., 1980). The pseudo-ranges are then used in multi-lateration to obtain a position fix of the GPS receiver. A typical accuracy for a commercial one point (i.e. no differential reception) GPS receiver with SPS is around 30 m RMS without Selective Availability (SA). In direct proportions, an AMPs land-based location system which initially uses a conventional sliding correlator at each MS to obtain a TOA estimate of the transmitted radio signal followed by a hyperbolic (differential) multi-lateration of all the TOA estimates (processed at some central site) should offer a location accuracy of around an unacceptable 900 m RMS assuming no multipath. The reason is that the correlation function from which a TOA may be estimated has a resolution which is limited to that of the Fourier transform. The traditional resolution bound on Fourier-based methods is the Rayleigh resolution criterion as shown in Haykin, S., "*Adaptive Filter Theory*," 2nd Edition, Prentice Hall, Englewood Cliffs, N.J., 1991. Further processing using SR algorithms often yields a result with higher resolution as shown by Dumont, L. R., et al., "Super-resolution of Multipath Channels in a Spread Spectrum Location System," *IEE Electronic Letters*, Vol. 30, No. 19, pp. 1583–1584, Sep. 15, 1994 and as shown by Fattouche et al., U.S. Pat. No. 5,570,305 issued October, 1996, and as shown by Ziskind, I. et al., "Maximum Likelihood Localization of Multiple Sources by Alternating Projection," *IEEE Transactions on Acoustics, Speech, and Signal Processing*, Vol. ASSP-36, No. 10, October, 1988. One of the contributions of this invention is to use SR and inverse SR algorithms to improve the resolution of the WLS beyond the Rayleigh resolution, as opposed to Stilp et al., U.S. Pat. No. 5,327,144 issued Jul. 5, 1994 which does not further process the correlation peak.

The Effect of the Observation Interval, $T_{i,k}$:

The Observation interval, $T_{i,k}$, is directly related to the energy $E_{i,k}$ in the received signal $r_{i,k}(t)$ at the k$^{th}$ antenna of the i$^{th}$ MS since $$E_{i,k} = \int_0^{T_{i,k}} |r_{i,k}(t)|^2 dt \quad (27)$$

It is also related to the steady state response of a filter in such a way that the response of the filter reaches its steady state as long as $$T_{i,k} \geq \frac{1}{BW_{i,k}} \quad (28)$$

where $BW_{i,k}$ is the bandwidth of the filter in the receiver corresponding to the k$^{th}$ antenna of the i$^{th}$ MS.

time delays, $\Delta_{i,k}$: The propagation delay $\tau_{i,k}$ is affected by $\Delta t_{i,k}$ which represents the system delay through antenna, cables, filters, amplifiers, etc. $\Delta t_{i,k}$ has to be estimated otherwise the propagation delay can be prolonged significantly.

interference, $I_{i,k}(t)$: Depending on the level of interference, $I_{i,k}(t)$ can have a drastic effect on the accuracy of the estimated phase and may saturate the RF front end of the receiver. Its effects can be mitigated with both analog and digital hardware, as well as adequate software, whether it is in-band or out-of-band.

multipathg $MP_{i,k}t$): The multipath $MP_{i,k}(t)$ is equivalent to an extra delay over the propagation channel and has to be either estimated and removed, or mitigated. In the case the estimated time delay, $\tau_{i,k}$, is used to solve for the TDOA between the received signal $r_{i,k}(t)$ and the received signal $r_{j,m}(t)$, the difference in multipath, $MP_{i,k}(t) - MP_{j,m}(t)$, is the distorting factor which has to be mitigated.

The effect of Multipath, $MP_{i,k}(t)$:

When multipath is considered, the accuracy of the AMPs land-based WLS could potentially degrade even further. The cellular frequency band is between 824 and 894 MHz and the propagation characteristics at these UHF frequencies will have a significant impact on positioning by multi-lateration as shown in Parsons D., "*The Mobile Radio Propagation Channel,*" John Wiley & Sons, New York, 1992. That the ranges measured correspond to Line Of Sight (LOS) distances is a major assumption made when estimating position by multilateration. Although the dominant transmission mode in this band is LOS, reflections from natural and man-made objects as well as diffraction around said objects are also possibilities. Multipath and diffraction allow the cellular signal to propagate in heavily built up areas as well as indoors. However, they also cause the measured ranges to be longer than the true LOS distance which introduces error into the multilateration process. In addition, the propagation distance at UHF is relatively short. This allows frequency reuse in the cellular system but limits the number of observables in the multilateration process. For instance, in a dense urban environment with a delay spread of 3 microseconds (as shown in Hata, M., "Empirical Formula for Radio Propagation Loss in Land Mobile Radio Services," *IEEE Transactions on Vehicular Technology,* Vol. VT-29, No. 3, August 1980) multipath causes the location accuracy to degrade to more than 1400 m RMS. Once again, the reason for this is that the correlation function from which the multipath may be estimated has a resolution which is limited to that of the Fourier transform which implies that any multipath within such a resolution is unresolvable using traditional methods. Further processing using an inverse SR algorithm often yields a result with higher multipath resolution as shown by Dumont, L. R., et al., "Super-resolution of Multipath Channels in a Spread Spectrum Location System," *IEE Electronic Letters,* Vol. 30, No. 19, pp. 1583–1584, Sep. 15, 1994 and as shown by Fattouche et al., U.S. Pat. No. 5,570,305 issued October, 1996, and as shown by Ziskind, I. et al., "Maximum Likelihood Localization of Multiple Sources by Alternating Projection," *IEEE Transactions on Acoustics, Speech, and Signal Processing,* Vol. ASSP-36, No. 10, October, 1988. Another approach to multipath resolution is due to Morley, G. D. et al., "Improved Location Estimation with pulse-ranging in presence of shadowing and multipath excess-delay effects," *Electronics Letters,* Vol. 31, No. 18, pp. 1609–1610, 31st August, 1995. Once again, one of the contributions of the invention is to use SR and inverse SR algorithms to better resolve the multipath components in the received radio signal, as opposed to Stilp et al., U.S. Pat. No. 5,327,144 issued Jul. 5, 1994 which does not further process the correlation peak to resolve Multipath.

Choices of p(t):

Regarding the types of AMPs signals to monitor, there are essentially two types:

1) The Reverse Analog Control Channel (RECC):

The RECC carries data and can be easily monitored. It is used for registering the mobile subscriber with a specific BS, answering pages and for placing calls. It can be used in a TDOA as well as in an Angle-of-Arrival (AOA) and velocity estimation WLS. It consists of a precursor followed by several repeated words that contain information regarding the mobile subscriber and the called number if it is an origination. Therefore, a 911 call can be easily monitored on such a channel. The precursor consists of a dotting sequence (30 bits), a barker code (11 bit word sync) and a color code (7 bits). The transmission time for one registration signal is approximately 100 ms: e.g.

| | |
|---|---|
| power-up: | negligible, |
| precursor: | 4.8 msec, |
| word A (MIN$_1$): | 24 msec, |
| word B (MIN$_2$): | 24 msec, |
| word C (ESN): | 24 msec, |
| unmodulated carrier: | 25 msec. |

2) The Reverse Analog Voice Channel (RVC):

The RVC carries mainly analog voice, except when the mobile terminal is "audited" by the BS over the forward voice channel (FVC). In this case, the mobile terminal is either in the "Waiting For Order" mode or in the "Waiting For Answer" mode and must confirm the order received on the FVC channel by replying with a "blank-and-burst" message. The order can be one of the following:

1. Alert (forces the phone to ring audibly);
2. Release (forces the phone to drop the call);
3. Stop Alert;
4. Audit (confirms the message sent to the mobile);
5. Send Called-address;
6. Intercept;
7. Maintenance;
8. Change Power to Power level 0-to-7;
9. Directed Retry;
10. Registration (forces another registration on the RECC);
11. Hand-offs;
12. Page Request;
13. Serial Number Request;
14. Shared Secret Data Update;
15. Challenge;
16. System Parameter Update.

During this process the audio path is muted. The "blank-and-burst" message is primarily used for hand-offs and also for order confirmations requested by the BS. The message stream consists of a dotting sequence (101 bits), a barker code (11 bits) and several repeated words which are interleaved by a smaller dotting sequence (37 bits) and a barker code. Since the data message is controlled by individual network requests, a non-network integrated wireless location system would have difficulty monitoring the RVC, identifying the mobile subscriber, and determining its location.

Unlike Stilp et al., U.S. Pat. No. 5,327,144 issued Jul. 5, 1994, this patent takes advantage of the FDMA nature of an AMPs CT where the signal is continuously transmitted over a frequency channel (except during BS generated interruptions) and hence, this patent allows the observation interval, $T_{i,k}$, to be increased at will, by deriving p(t) from the received signal, $r_{i,k}(t)$. In the analog world however, p(t) is unknown to the i$^{th}$ MS, unless it is an existing or generated tone. There are several choices of tones over the RVC channel. It is the intention of the patent to use equation (5) to estimate the position (x,y) and the velocity, $\vec{v}$, of a CT.

Choices of Tones for Solution IV:

There are existing tones and there are generated tones. Both types of tones carry the CT location information in their phases (mod $2\pi$).

Choices of Existing Tones:
1. The dotting sequence in the Precursor over the RECC Channel:

Over the RECC Channel, the Manchester-encoded dotting sequence in the Precursor consists of a one-zero sequence repeated a number of times (30 times). Such a sequence can therefore be approximated using Fourier series, or equivalently, a number of tones can be used to approximate the dotting sequence:

$$\text{Dotting}(t - \tau_{i,k}) = \sum_{n=-\infty}^{\infty} c_n \cos[2\pi n f_m (t - \tau_{i,k})] \quad (29a)$$

where $f_m$ is the fundamental frequency of the dotting sequence=5 KHz;

$\tau_{i,k}$ is the propagation delay at $k^{th}$ antenna of the $i^{th}$ MS; and $c_n$ is the Fourier Coefficient of the dotting sequence.

Alternatively, after FM modulation, the dotting sequence can be expressed as (as shown in Haykin, S. "*An Introduction To Analog And Digital Communications*," John Wiley & Sons, New York 1989):

$$s(t-\tau_{i,k})|_{Dotting} = A_c \text{Re}\{\exp[j2\pi f_c(t-\tau_{i,k}) + j\beta \text{ Dotting}(t-\tau_{i,k})]\} \quad (29b)$$

where $f_c$ is the carrier frequency;

$\tau_{i,k}$ is the propagation delay at the $k^{th}$ antenna of the $i^{th}$ MS;

$\beta$ is the modulation index of the FM wave.

This implies that the FM modulated dotting sequence can also be approximated using a number of tones.

In summary, whether modulated or not, the dotting sequence can be approximated using tones with phases that can contain location information. The difference between an FM modulated dotting sequence versus an unmodulated dotting sequence is the frequency of the tones approximating the sequence. When modulated, the fundamental frequency is the carrier frequency, $f_c$. When unmodulated, the fundamental frequency is 5 KHz.

2. The SAT Tone over the RVC Channel:

The Supervisory Audio Tone (SAT) exists over the RVC during either "waiting for answer" mode or "conversation" mode. After FM modulation, the SAT tone can be expressed as (as shown in Haykin, S. "*An Introduction To Analog And Digital Communications*," John Wiley & Sons, New York 1989):

$$s(t - \tau_{i,k})|_{SAT} = \quad (30a)$$
$$A_c \text{Re}\left\{\exp[j2\pi f_c(t - \tau_{i,k})] \sum_{n=-\infty}^{\infty} c_n \exp(2\pi n f_{SAT}(t - \tau_{i,k}))\right\}$$

where $f_{SAT}$ is the SAT frequency=5970 Hz, 6000 Hz and 6030 Hz;

$c_n$ is the complex Fourier Coefficient of the FM modulated SAT tone which has even symmetry in its real part and odd symmetry in its imaginary part. In this case, $c_n = A_c J_n(\beta_{SAT})$ where $J_n(\beta_{SAT})$ is the $n^{th}$ order Bessel function of the first kind, $\beta_{SAT} = \frac{1}{3}$ and $A_c$ is the amplitude of the carrier.

Since $\beta_{SAT}$ is small, the modulation is narrowband FM, i.e. the LP equivalent signal, $\tilde{s}(t-\tau_{i,k})|_{SAT}$, for the SAT tone can be approximated as $$\tilde{s}(t - \tau_{i,k})|_{SAT} \cong A_c + \frac{\beta_{SAT} A_c}{2} \exp(2\pi f_{SAT}(t - \tau_{i,k})) - \quad (30b)$$
$$\frac{\beta_{SAT} A_c}{2} \exp(-2\pi f_{SAT}(t - \tau_{i,k}))$$

as shown in Haykin, S. "*An Introduction To Analog And Digital Communications*," John Wiley & Sons, New York 1989, where $\tilde{s}(t)$ is the LP equivalent of s(t). From equation (30a), the carrier frequency corresponds to the first term in (30b) with an amplitude of $A_c$. This is the term to use for estimating $\psi_{i,k}$ in (10) for AOA positioning. It is more difficult to use $\psi_{i,k}$ for TDOA positioning due to the fact that there can be a large number of ambiguities depending on the baseline between antennas relative to the wavelength of the carrier. In order to circumvent the large number of ambiguities, the last two terms in equation (30b) can be used together as follows:

$(t-\tau_{i,k})=\{\text{phase of } 2^{nd} \text{ term in (30b)}-\text{phase of } 3^{rd} \text{ term in (30b)}-\pi\}/(2\pi f_{SAT})$ \quad (31)

3. The Sipnaling Tone over the RVC Channel:

The Signaling Tone (ST) exists over the RVC during either "waiting for answer" mode or "conversation" mode. After FM modulation, the ST tone can be expressed as:

$$s(-\tau_{i,k})|_{ST} = A_c \text{Re}\left\{\exp[j2\pi f_c(t - \tau_{i,k})] \sum_{n=-\infty}^{\infty} c_n \exp(2\pi n f_{ST}(t - \tau_{i,k}))\right\} \quad (32a)$$

where $f_{ST}$ is the ST frequency=10 kHz; and $c_n$ is the complex Fourier Coefficient of the FM modulated ST tone which has even symmetry in its real part and odd symmetry in its imaginary part. In this case, $c_n = A_c J_n(\beta_{ST})$ where $J_n(\beta_{ST})$ is the $n^{th}$ order Bessel function of the first kind, $\beta_{ST}=0.8$ and $A_c$ is the amplitude of the carrier.

Even though $\beta_{ST}$ is not small, the LP equivalent signal, $\tilde{s}(t-\tau_{i,k})|_{ST}$, for the ST tone can be expressed as the following four terms:

$$\tilde{s}(t - \tau_{i,k})|_{SAT} = A_c + \frac{\beta_{ST} A_c}{2} \exp(2\pi f_{ST}(t - \tau_{i,k})) - \quad (32b)$$
$$\frac{\beta_{ST} A_c}{2} \exp(-2\pi f_{ST}(t - \tau_{i,k})) +$$
$$\text{extra terms}$$

where the extra terms in equation (32b) are the remaining terms from the Fourier series that correspond to frequencies other than the fundamental frequency $f_c$, and its first sidebands: $f_c + f_{ST}$ and $f_c - f_{ST}$.

Once again, from equation (32a), the carrier frequency corresponds to the first term in (32b) with an amplitude of $A_c$. This is the term to use for estimating $\psi_{i,k}$ in (10) for AOA positioning. It is more difficult to use $\psi_{i,k}$ for TDOA positioning due to the fact that there can be a large number of ambiguities depending on the baseline between antennas relative to the wavelength of the carrier. In order to circumvent the large number of ambiguities, the last two terms in equation (32b) can be used together as follows:

$(t-\tau_{i,k})=\{\text{phase of } 2^{nd} \text{ term in (32b)}-\text{phase of } 3^{rd} \text{ term in (32b)}-$ $$\pi\}/(2\pi f_{ST}) \qquad (33)$$

4. Speech Tones over the RVC Channel:

Any voiced speech signal consists of harmonics of a fundamental frequency referred to as the pitch of the speech signal. An equation similar to (30b) or (32b) exists for the voiced speech signal. Similarly, an equation similar to (31) or (33) also exists for the voiced speech signal. Both equations can be used for positioning a CT.

Choices of Generated Tones:

20 KHz Tone Generated Using a Nonlinear Operation on the RECC Signal:

In addition, the RECC signal is a cyclo-stationary signal. In other words, it generates a tone when a nonlinear operation is performed over it after FM demodulation. For example, if squared after FM demodulation, a 20 KHz tone is generated.

The practical description of the patent will describe methods and apparatus to estimate $\tau_{i,k}$ and to mitigate its sources of errors.

4. $f_{i,k}$: In the kinematic case where the CT moves with respect to the MSs, the speed and Direction Of Travel (DOT) of the CT is of interest in this patent. The only source of information one can use to extract an independent equation for the speed and DOT of the CT is $$f_{i,k} = \delta f_{i,k} - \Delta f_{i,k} + \Delta f_o \qquad (34)$$

which can be used to estimate the Doppler shift $\delta f_{i,k}$. This is explained in FIG. 6 which assumes a three antenna system: the $m^{th}$ antenna at $MS_1$ with coordinates $(x_{1,m}, y_{1,m}, z_{1,m})$, the $k^{th}$ antenna at $MS_2$ with coordinates $(x_{2,k}, y_{2,k}, z_{2,k})$ and the $n^{th}$ antenna of $MS_3$ with coordinates $(x_{3,n}, y_{3,n}, z_{3,n})$. In this case, the FOAs: $f_{1,m}$, $f_{2,k}$ and $f_{3,n}$ are related to the Direction Of Travel (DOT), $\phi$, relative to Northing (clockwise), to the speed of travel, v, and to the frequency offsets $\Delta f_{i,k}$, as follows:

$$f_{1,m} = \delta f_{1,m} - \Delta f_{1,m} + \Delta f_o \qquad (35a)$$
$$= v/\lambda \cos(\varphi - \Lambda_{1,m}) - \Delta f_{1,m} + \Delta f_o$$

$$f_{2,k} = \delta f_{2,k} - \Delta f_{2,k} + \Delta f_o \qquad (35b)$$
$$= v/\lambda \cos(\varphi - \Lambda_{2,k}) - \Delta f_{2,k} + \Delta f_o$$

$$f_{3,n} = \delta f_{3,n} - \Delta f_{3,n} + \Delta f_o \qquad (35c)$$
$$= v/\lambda \cos(\varphi - \Lambda_{3,n}) - \Delta f_{3,n} + \Delta f_o$$

where $\Lambda_{1,m}$ is the clockwise angle from Northing to the line formed by $(x_{1,m}, y_{1,m})$ and $(x,y)$, $\Lambda_{2,k}$ is the clockwise angle from Northing to the line formed by $(x_{2,k}, y_{2,k})$ and $(x,y)$, $\Lambda_{3,n}$ is the clockwise angle from Northing to the line formed by $(x_{3,n}, y_{3,n})$ and $(x,y)$, and $(x,y)$ are the 2-D (horizontal) coordinates of the CT.

In other words, there are three equations (35a, b and c) with 6 unknowns: $(\phi, v, \Delta f_{1,m}, \Delta f_{2,k}, \Delta f_{3,n}$ and $\Delta f_o$. This is a problem that can be resolved if the frequency offsets $\Delta f_{i,k}$ are made equal to one another, i.e.

if $\Delta f_{1,m} = \Delta f_{2,k} = \Delta f_{3,n} = \Delta f$, then we have two equations with two unknowns: v and $\phi$ after using Frequency Difference Of Arrival (FDOA):

$$-f_{1,m} + f_{2,k} = v/\lambda \cos(\phi - \Lambda_{1,m}) - v/\lambda \cos(\phi - \Lambda_{2,k}) \qquad (36a)$$

$$-f_{2,k} + f_{3,n} = v/\lambda \cos(\phi - \Lambda_{2,k}) - v/\lambda \cos(\phi - \Lambda_{3,n}) \qquad (36b)$$

We refer to such a solution as Solution V. Note that in Solution V the position of the CT (x,y) must be known (or estimated) prior to estimated the speed and velocity of the CT, in order to be able to know $\Lambda_{1,m}$, $\Lambda_{2,k}$ and $\Lambda_{3,n}$ in equations (36).

In processing $f_{i,k}$ to estimate $\delta f_{i,k}$, we have the following sources of errors:

noise, $w_{i,k}(t)$: The Cramer-Rao Lower Bound provides a lower bound on the effect of AWGN on the variance, $\text{var}(\delta \hat{f}_{i,k})|_{Tone}$, of the estimate of the frequency $\delta f_i$ of a tone:

$$\text{var}(\delta \hat{f}_{i,k})|_{Tone} \geq \frac{12}{SNR_{i,k}|_{Tone} \times N_{i,k} \times (N_{i,k}^2 - 1) \times 4\pi^2} \qquad (37)$$

where $\text{var}(\delta \hat{f}_{i,k})|_{Tone}$ is the variance of the estimate, $\delta \hat{f}_{i,k}$, of the frequency $\delta f_{i,k}$, $SNR_{i,k}|_{Tone} = A_{i,k}^2/(2\sigma_n^2)$ is the SNR of the tone at the $k^{th}$ antenna of the $i^{th}$ MS, $A_{i,k}$ is the amplitude of the tone at the $k^{th}$ antenna of the $i^{th}$ MS, $\sigma_n^2$ is the noise variance, and $N_{i,k}$ is the number of samples (which is directly related to the observation interval $T_{i,k}$).

frequency offsets, $\Delta f_{i,k}$: As mentioned above, there are three equations (35a–35c) with 6 unknowns: $\phi$, v, $\Delta f_{1,m}$, $\Delta f_{2,k}$, $\Delta f_{3,n}$ and $\Delta f_o$. This problem can be resolved if the frequency offsets $\Delta f_{i,k}$ are either removed or made equal to one another, i.e. if $\Delta f_{1,m} = \Delta f_{2,k} = \Delta f_{3,n} = \Delta f$. It is more realistic to have $\Delta f_{1,m} = \Delta f_{2,k} = \Delta f_{3,n} = \Delta f$ than to estimate and remove the frequency offsets.

multipath, $MP_{i,k}(t)$: The effect of the multipath $MP_{i,k}(t)$ in this case is to add some Doppler shift to $\delta f_{i,k}$ due to dynamic (non-stationary) reflectors such as cars, buses, trucks, etc.

interference, $I_{i,k}(t)$: In this case, $I_{i,k}(t)$ plays the same role in distorting the estimate of the frequency $\delta f_{i,k}$ as in distorting the estimate of the phase $\zeta_{i,k}$ except that its effect can be reduced more significantly.

Error in Estimating (x,y): In equations (36) it is assumed that the position, (x,y), of the CT is known prior to estimating its speed and DOT. This is usually not true and (x,y) needs to be estimated first. The estimation of (x,y) is imperfect, implying that it will contain errors that can affect the estimation of the speed of the CT and its DOT.

The practical description of the patent will describe methods and apparatus to estimate $\delta f_{1,m}$, $\delta f_{2,k}$ and $\delta f_{3,n}$ and to mitigate its sources of errors.

Positioning Technologies:

1. TOA/Range Positioning (Circular Multilateration)

In a 2-D (horizontal) location system it is possible to estimate the position of a CT from the range of the CT to at least two MSs. The CT horizontal position estimate is simply the intersection of two horizontal circles with radii equal to the ranges and centered at the MSs. This method of positioning may therefore be called circular multilateration. Ranges may be calculated by subtracting the known time of transmission $\tau_o$ of signal s(t) from the measured TOAs, $\tau_{i,k}$, of signal $r_{i,k}(t)$. There are three possible solutions:

1. When the Time of Transmission, $\tau_o$, is known, we refer to the positioning technique as Range positioning.

2. When the time of transmission, $\tau_o$, is unknown, and to be estimated, we refer to the positioning technique as TOA positioning.

3. When the time of transmission, $\tau_o$, is unknown, and to be eliminated using TDOA, we refer to the positioning technique as TDOA positioning (which is discussed in the following two sections).

In Range positioning, one way of determining the time of transmission, $\tau_o$, is to use the RTD between the BS transmission and the reception of the CT's response to the BS transmission. In this case, a minimum of two independent equations is required to solve for the two unknowns x and y.

In TOA positioning, there are now three unknowns: x, y and $\tau_o$. TOAs from three MSs are required and the equation for the $k^{th}$ antenna at the $i^{th}$ MS is $$\tau_{i,k} - \tau_o - \frac{1}{c}\sqrt{(x-x_{i,k})^2 + (y_{i,k})^2} = 0 \quad (38)$$

where $\tau_{i,k}$ is the Time Of Arrival of signal $r_{i,k}(t)$ at the $k^{th}$ antenna of the $i^{th}$ MS, $\tau_o$ is the time of transmission of signal s(t) from the CT, (x,y) is the best known 2-D position of the CT, $(x_{i,k}, y_{i,k})$ is the known 2-D position of the $k^{th}$ antenna at the $i^{th}$ MS where i=1, ..., N.

When more than the minimum number of MSs, as explained above, are available, redundancy is said to exist. If a redundant set of measured TOAs contain errors, the TOAs must be adjusted in order to obtain a unique solution to the unknowns. The amount by which each TOA is adjusted is called the residual. Several methods of adjusting the observed TOAs such that the sum of the squares of the residuals is a minimum are available including:

General Minimum Variance Unbiased Estimation,
Best Linear Unbiased Estimation
Maximum Likelihood Estimation,
Least Squares Estimation,
Method of Moments,
General Bayesian Estimation,
Linear Bayesian Estimation,
Kalman Filtering, etc.

In this patent, a preferred embodiment of the method to adjust the observed TOAs such that the sum of the squares of the residuals is a minimum is Least Squares Estimation.

Effect of Geometry on TOA Positioning

In a location system, geometry (that is the relative positions of the MSs with respect to each other and the CT to be positioned) plays an important role as shown in equation (39)

$$\text{std(position)} = \text{DOP} \times \text{std}(\hat{R}_{i,k}) \quad (39)$$

where $\text{std}(\hat{R}_{i,k})$ is the standard deviation of the range estimate $\hat{R}_{i,k}$ obtained from equations (19) or (26), and DOP is Dilution Of Precision which is a measure of geometry.

In a 2-D location system, it is common to refer to the Horizontal DOP (HDOP) which is defined as $$\text{HDOP} = \sqrt{\text{EDOP}^2 + \text{NDOP}^2} \quad (40)$$

where

EDOP is the East DOP and is defined as the square root of the element in the $1^{st}$ row and $1^{st}$ column of $C_{TOA}$, NDOP is the North DOP and is defined as the square root of the element in the $2^{nd}$ row and $2^{nd}$ column of $C_{TOA}$, $C_{TOA}$ is an unscaled matrix defined as $C_{TOA} = [A^T C_1^{-1} A]^{-1}$, $C_1$ is the unscaled measurement covariance matrix (the identity matrix of appropriate dimension), A is the design matrix for the model of equation (38) and is defined as $$A = \frac{1}{c}\begin{bmatrix} -\frac{x-x_{1,k}}{d_{1,k}} & -\frac{y-y_{1,k}}{d_{1,k}} & -c \\ -\frac{x-x_{2,k}}{d_{2,k}} & -\frac{y-y_{2,k}}{d_{2,k}} & -c \\ \vdots & \vdots & \vdots \\ -\frac{x-x_{N,k}}{d_{N,k}} & -\frac{y-y_{N,k}}{d_{N,k}} & -c \end{bmatrix} \quad (41)$$

and $d_{i,k}$ is the best derived distance (range) between the CT and the $k^{th}$ antenna at the $i^{th}$ MS.

Weighting of the TOA Observations

In the position estimation process, not all TOA observations need carry the same weight. TOA observations thought to be more reliable may be weighted more heavily than those that are deemed less reliable. This is accomplished through the observation covariance matrix. The inverse of $C_1$ is the weight matrix. Larger values on the diagonal of $C_1^{-1}$ correspond to heavier weighting for the corresponding TOA observations. In the context of cellular telephone positioning, RSSI at each MS is one method of assigning weights to the TOAs. A high RSSI at a MS implies a reliable TOA. This is due to two facts:

1. The RSSI at a MS usually consists of received signal power+received noise power. The noise in the receiver is mainly thermal noise which is a function of bandwidth and temperature. When two MSs have comparable temperatures and bandwidths, the received noise power is approximately the same in both MSs. Thus, a high RSSI implies a high received signal power, which in turn implies a high SNR. This is desirable.

2. Furthermore, a higher RSSI usually implies less shadowing than a lower RSSI, which in turn implies less multipath. This is also desirable.

Blunder Detection in TOA Positioning

Blunders are gross errors in the TOA observations. This can be caused by large signal level fluctuations due to either flat fading or sudden in-band interference. If unremoved, blunders cause large errors in the estimated position. It is possible to detect observations containing blunders by observing the misclosure of each observation during the iterative Least Squares process. Misclosure is defined as the value of the position model (38) given the best available position estimate (x,y). Observations containing blunders will generally have much larger misclosures than observations not containing blunders. When an observation is detected as having a blunder it may be removed from the position estimation process.

This patent attempts to reduce the effect of geometry, i.e. reduce the value of HDOP in (40), by allowing a large number of MSs to monitor one CT. In cellular commnunications, frequency reuse and flat fading are common occurrences. Therefore, increasing the number of monitoring MSs (which probably reduces HDOP) generally increases $\text{std}(\hat{R}_{i,k})$. As a result blunder detection is crucial as part of the method of minimizing positional error by maximizing the number of MSs (and hence reducing HDOP) without incurring a large penalty on $\text{std}(\hat{R}_{i,k})$. In cases where blunders are not detected, poor SNR at some MSs may cause the inclusion of measurements from those MSs to increase the std(range) more than they reduce HDOP. With this trade-off in mind, the invention optimizes the number of MSs used to locate the CT such that std(position) in (39) is minimized.

Blunders may also be detected by a statistical analysis of the observation residuals computed from the Least Squares process as shown by Vanicek, P., Krakiwsky, E., "*Geodesy: The Concepts*," North-Holland Publishing Company, Amsterdam, 1982. The residual of each TOA observation may be standardized by its own estimated standard deviation such that the entire set of residuals is assumed to belong to the normal distribution with zero mean and unit standard deviation. If this hypothesis is correct, the standardized residuals should fall within some specified confidence region for the standard normal distribution. An observation whose residual is flagged is suspected of containing a blunder.

2. TDOA Positioning (Hyperbolic Multilateration)

Instead of estimating the unknown time of transmission, it is possible to eliminate it. This is accomplished by differencing TOAs from two different MSs. Since the time of transmission is common to both it is eliminated from the resulting TDOA (Time Difference Of Arrival). It can be shown that the locus of points for which a particular TDOA is valid corresponds to a hyperbola. The side of the hyperbola on which the CT must lie is known by the sign of the TDOA. Given TOAs from three MSs, two independent TDOAs may be formed. The intersection of the two corresponding hyperbolas estimates the position of the CT. This method is commonly referred to as hyperbolic multilateration.

The 2-D positioning model for hyperbolic multilateration is $$\Delta\tau_{ij,km} - \frac{1}{c}\sqrt{(x - x_{i,k})^2 + (y - y_{i,k})^2} + \frac{1}{c}\sqrt{(x - x_{j,m})^2 + (y - y_{j,m})^2} = 0 \quad (42)$$

where $\Delta\tau_{ij,km} = \tau_{i,k} - \tau_{j,m}$, $i \neq j$ or $k \neq m$, and $\tau_{i,k}$ is the Time Of Arrival of signal $r_{i,k}(t)$ at the $k^{th}$ antenna of the $i^{th}$ MS.

Effect of Geometry on TDOA Positioning

Geometry affects TDOA positioning as well. The HDOP is again calculated from (40) where the design matrix is now $$A = \frac{1}{c}\begin{bmatrix} -\frac{x - x_{2,m}}{d_{2,m}} + \frac{x - x_{1,k}}{d_{1,k}} & -\frac{y - y_{2,m}}{d_{2,m}} + \frac{y - y_{1,k}}{d_{1,k}} \\ -\frac{x - x_{3,n}}{d_{3,n}} + \frac{x - x_{1,k}}{d_{1,k}} & -\frac{y - y_{3,n}}{d_{3,n}} + \frac{y - y_{1,k}}{d_{1,k}} \\ \vdots & \vdots \\ -\frac{x - x_{N,l}}{d_{N,l}} + \frac{x - x_{1,k}}{d_{1,k}} & -\frac{y - y_{N,l}}{d_{N,l}} + \frac{y - y_{1,k}}{d_{1,k}} \end{bmatrix} \quad (43)$$

where N in (43) is the number of MSs. Note that the TOA at the $k^{th}$ antenna of the first MS is subtracted from all other TOAs.

The unscaled observation covariance matrix is $$C_1 = \begin{bmatrix} 2 & 1 & \cdots & 1 \\ 1 & \ddots & 1 & \vdots \\ \vdots & 1 & \ddots & 1 \\ 1 & \cdots & 1 & 2 \end{bmatrix}. \quad (44)$$

Weighting of the TDOA Observations

Weighting of the TDOA observations is possible. However, because the TDOAs are a function of two TOAs, the method of assigning weights is no longer straightforward.

Blunder Detection in TDOA Positioning

Blunder detection may also be performed in TDOA positioning. However, in this context, misclosures and residuals correspond to TDOAs. Therefore, a failing risclosure or residual may be due to a blunder in either of the TOA observations from which the TDOA is derived. It is not always possible to isolate the offending MS.

Multiple Solutions in TDOA Positioning

Two hyperbola halves, formed from two independent TDOAs, may intersect twice. This results in two mathematically correct solutions. This is particularly true in the case of positioning CTs where short distances and poor geometry are commonplace.

Solution bifurcation (the existence of two solutions to the positioning equations) is most often a concern in the exactly determined case. For the exactly determined case, the existence of two solutions can be detected with the method given in Chaffee, J. W. et al., "Bifurcation of Pseudorange Equations," *Proceedings of the* 1993 *National Technical Meeting*, San Francisco, Calif., Jan. 20–22, 1993, The Institute of Navigation. Although originally intended for the detection of bifurcation in the GPS (Global Positioning System), this method is equally applicable to the case of CT positioning.

When more than two TDOAs are available in the 2-D positioning case, the probability of exact solution bifurcation is extremely small. It is, however, possible for bifurcation to exist for a subset of two TDOAs. In such a case, the second solution may affect the final solution obtained when using all available TDOAs.

In any case, when solution bifurcation exists, the iterative Least Squares position estimation algorithm may converge to either of the solutions. The solution converged to is a function of the initial starting position used to begin the iterative Least Squares process. To converge to the solution corresponding to the actual position of the CT, the initial position used to begin Least Squares must be relatively accurate. Given no a priori information about the location of the CT, a closed-form position estimation algorithm, using the TOA or TDOA observations, is the only choice.

A number of closed-form positioning algorithms have been developed. Examples are, spherical interpolation (Smith, J. O., et al., "Closed-Form Least-Squares Source Location Estimation from Range-Difference Measurements," *IEEE Transactions on Acoustics, Speech, and Signal Processing*, Vol. ASSP-35, No. 12, December 1987, pp. 1661–1669), the method of Schau and Robinson (Schau, H. C., et al., "Passive source localization employing intersecting spherical surfaces from time-of-arrival differences," *IEEE Transactions on Acoustics, Speech, and Signal Processing*, Vol. ASSP-35, No. 8, August 1987, pp. 1223–1225), Bancroft's method (Bancroft, S., "An algebraic solution of the GPS equations," *IEEE Transactions on Aerospace and Electronic Systems*, Vol. AES-21, No. 7, January 1985, pp. 56–59), the method of Chan and Ho (Chan, Y. T., et al., "A Simple and Efficient Estimator for Hyperbolic Location," *IEEE Transactions on Signal Processing*, Vol. 42, No. 8, August 1994, pp. 1905–1915), and LOCA (Location On the Conic Axis) by Schmidt, R. O. "A New Approach to Geometry of Range Difference Location," *IEEE Transactions on Aerospace and Electronic Systems*, Vol. AES-8, No. 6, November 1972, pp. 821–835.

LOCA is used in the preferred embodiment of the invention. LOCA is the mathematical dual of hyperbolic trilateration. The fundamental theorem of LOCA states that TOA differences for three MSs of known location yield a straight line of position. This straight line is the major axis of a conic. The three MSs lie on the conic and the CT, the location of which is being estimated, lies at one of the foci of the conic. In the case of redundancy and 3-D positioning, LOCA is expanded into Plane Intersection as shown by Schmidt, R. O., "A New Approach to Geometry of Range Difference Location," *IEEE Transactions on Aerospace and Electronic Systems*, Vol. AES-8, No. 6, November 1972, pp. 821–835. Plane Intersection is equally applicable to the case of redundancy in 2-D positioning.

In LOCA, three conics are possible: an ellipse, hyperbola, or parabola. The conic of interest depends on the relative positions of the MSs and the CT to be positioned. Each of these conics has two foci (for the parabola one focus is at infinity) and therefore two possible solutions. In the case, of an ellipse, the correct focus is determined from the signs of the TDOAs. In the case of the parabola, the solution is obvious. When the conic is a hyperbola, however, the correct focus cannot be determined from the given TDOAs. Chaffee's method of bifurcation detection in Chaffee, J. W. et al., "Bifurcation of Pseudorange Equations," *Proceedings of the 1993 National technical Meeting*, San Francisco, Calif., Jan. 20–22, 1993, The Institute of Navigation, will indicate bifurcation for the case of the hyperbola and no bifurcation for the cases of the ellipse and parabola. With four MSs, a second conic is obtained. The intersection of the major axes of the two conics is the CT position estimate. Hence, there is no ambiguity and bifurcation is, therefore, not of concern when using Plane Intersection in the presence of redundancy.

If the TOAs contain large errors, LOCA or Plane Intersection may give a very poor solution. When used as the initial position for Least Squares, this poor solution may cause Least Squares to diverge. In that case, the best available course of action may be to average the coordinates of the participating MSs and use that as the initial position for Least Squares. Another alternative is to use the approximate coordinates of the MS with which the CT is communicating, as the initial position.

3. Hybrid TDOA Positioning (Circular Multilateration with TDOAs)

In some cases it is desirable, or even necessary, to use TDOAs as opposed to TOAs. However, as explained above, it is not always possible to isolate blunders when using TDOAs. It is possible, however, to construct a positioning model that uses TDOAs but gives residuals and misclosures for individual TOAs.

To do this, one MS is chosen as the reference. The assumption is then made that the TOA at the reference site is equal to the time of transmission, $\tau_o$. From this point on, the development follows that of circular multilateration except that the TOA of the reference MS is subtracted from all TOAs (including that of the reference MS) instead subtracting the time of transmission. The positioning model is then $$\Delta\tau_{i1,k1} + \frac{1}{c}R_u - \frac{1}{c}\sqrt{(x-x_{i,k})^2 + (y-y_{i,k})^2} = 0 \quad (45)$$

where $\Delta\tau_{i1,k1} = \tau_{i,k} - \tau_{1,1}$, i=1, ..., N and
$R_u$ is the range from the reference (first) antenna of $MS_1$ to the position of the CT.

The model of (45) has the same structure as that of circular multilateration (equation(38)) except that the third unknown is $R_u$ and not the time of transmission.

The model of (45) gives N observations, and therefore N residuals and misclosures, for N MSs. The N observations, however, are a 0 and N–1 TDOAs. The structure of the equations is that of TOA positioning whereas the observations are that of TDOA positioning. Hence, the name Hybrid TDOA Positioning.

Effect of Geometry on Hybrid TDOA Positioning

The design matrix for hybrid TDOA positioning is $$A = \frac{1}{c}\begin{bmatrix} -\frac{x-x_{1,1}}{d_{1,1}} & -\frac{y-y_{1,1}}{d_{1,1}} & 1 \\ -\frac{x-x_{2,k}}{d_{2,k}} & -\frac{y-y_{2,k}}{d_{2,k}} & 1 \\ \vdots & \vdots & \vdots \\ -\frac{x-x_{N,m}}{d_{N,m}} & -\frac{y-y_{N,m}}{d_{N,m}} & 1 \end{bmatrix} \quad (46)$$

Note that (46) is the same as (41) except for the third column which corresponds to the third unknown.

The unweighted and unscaled observation covariance matrix, $C_1$, is the same as that for TOA positioning, the identity matrix of dimension N.

DOPs may be calculated, as before, from $[A^T C_1^{-1} A]^{-1}$.

Weighting of the Hybrid TDOA Observations

Although the observations are, strictly speaking, TDOAs, they may be treated as observations corresponding to the individual MSs. That is, the first observation, which is always zero, may be viewed as the observation of the reference (or first) MS. The second observation, consisting of the TOA of the reference MS subtracted from the TOA of the second MS, is treated as the observation of the second MS, and so on. Therefore, the N diagonal elements of $C_1$ may be weighted for the individual MSs.

Blunder Detection in Hybrid TDOA Positioning

In like manner, N independent misclosures and residuals, one for each MS, are available for analysis. Blunder detection may then be performed as in the case of TOA positioning and blunders in individual TOA observations may be detected.

Multiple Solutions in Hybrid TDOA Positioning

Since the observations used are actually TDOAs, this method of positioning is subject to solution bifurcation. The method of dealing with multiple solutions discussed under hyperbolic multilateration is equally applicable here.

4. AOA Position:

Given unambiguous AOA measurements, only two unknowns exist for position estimation—the 2-D coordinates of the CT to be positioned. Therefore, a minimum of two independent AOA measurements are required. Again let (x,y) be the 2-D coordinates of the CT and $(x_{i,k}, y_{i,k})$ the 2-D coordinates of the $k^{th}$ antenna of the $i^{th}$ MS. At the $k^{th}$ antenna of the $i^{th}$ MS, the AOA, $\Lambda_{i,k}$, is measured, where:

$\Lambda_{i,k}$ is the clockwise angle from Northing to the line joining the CT to the kth antenna of the ith MS (similar to $\Lambda_{i,k}$ in equations (35) and (36); not to be confused with $\gamma_{i,k}$ in equations (15), (16), (21), (22) and (23)).

The mathematical positioning model is then $$(x-x_{i,k})\cos \Lambda_{i,k} - (y-y_{i,k})\sin \Lambda_{i,k} = 0 \qquad (47)$$

When more than two independent AOA observations are available, Least Squares may be used to obtain a unique solution. Without loss of generality, the patent assumes that $\Lambda_{i,1} = \Lambda_{i,2} = \ldots = \Lambda_i$, i.e. that the CT is far from the $i^{th}$ MS with respect to the baseline between all antennas at the $i^{th}$ MS, and that the ranges $R_{i,1} = R_{i,2} = \ldots = R_i$.

Effect of Geometry on AOA Positioning

The relative positions of MSs with respect to each other and the CT to be positioned are also important for AOA positioning. DOP may again be used to quantify geometry. From the 2-D positioning model (47), the design matrix is found to be $$A = \begin{bmatrix} \cos \Lambda_1 & -\sin \Lambda_1 \\ \cos \Lambda_2 & -\sin \Lambda_2 \\ \vdots & \vdots \\ \cos \Lambda_N & -\sin \Lambda_N \end{bmatrix} \qquad (48)$$

The unscaled and unweighted observation covariance matrix, $C_1$, is the identity matrix of dimension N. The DOPs can again be found from $[A^T C_1^{-1} A]^{-1}$.

Weighting of the AOA Observations

The individual AOA observations may be weighted through the observation covariance matrix $C_1$. Those AOA observations deemed more reliable are assigned a smaller variance, or conversely, a heavier weight.

Blunder Detection in AOA Positioning

As in the case of TOA or TDOA observations, AOA observations may contain blunders. When redundant observations are available, statistical testing of the observation residuals and misclosures may be used to detect observations which contain blunders.

Notes:

1. As mentioned above, the AOA solution in equation (15) has an ambiguity problem which can be resolved either by
   using TDOA as well as AOA as explained in the next section, or
   using more than two antennas at the same MS. This is possible in sectorized cells since each sector has usually two diversity antennas. In other words, in a three sector cell a total of six antennas could be available.

2. When the diversity antennas are separated only vertically, the estimated AOA is the elevation angle. In this case, it is possible to use both diversity antennas since they are independent from each other, i.e. they offer independent observations. The simplest method to use both observations is by combining them using: selection combining, maximal ratio combining, co-phasing combining, equal gain combining, or other methods of combining.

5. AOA/TDOA Positioning:

Least Squares allows for the combination of different types of observations. In particular, it is possible to estimate 2-D position using both AOA observations and TDOA observations within a single Least Squares adjustment.

A combination of the two different observation types is particularly useful in situations where only two MSs are available for estimating the 2-D position of a CT. When two antennas at a particular MS are used to estimate the incoming signal AOA for that MS, numerous AOA ambiguities are possible as shown in equation (15). This is due both to the nature of AOA estimation with a 1-D linear array, and to the fact that the spacing between elements can be greater than one wavelength. Therefore, with two MSs and AOA observations only, many position solutions are possible and there is no way of determining which of the many solutions is correct.

If, however, TOA is also measured at each of the two MSs (maybe using $p(t-\tau_{i,k}+\tau_o-\Delta t_{i,k})$ in equation (20)), a TDOA can be calculated. This TDOA corresponds to a hyperbola side which, in the absence of error, will cross through the intersection point of two of the many bearing lines derived from the ambiguous AOAs.

When the AOA and TDOA observations include error, no two bearing lines and the measured hyperbola side will exactly intersect. For the measured TDOA and any two particular AOAs, Least Squares will give the position solution which minimizes the sum of the squares of the residuals. Observation residuals are available since there are two unknowns, the 2-D coordinates, but three observations (2 AOAs and 1 TDOA).

In order to separate the correct AOA pair from the ambiguities, each AOA combination is combined with the TDOA observation in Least Squares. That combination of AOAs which results in the smallest sum of squares of residuals is chosen as correct. The corresponding position solution is used as the CT position estimate.

When combining AOA and TDOA observations in Least Squares, both the model for AOA positioning (47) and the model for TDOA positioning (42) are used. Without loss of generality, the design matrix A for two AOA observations (one at each of two MSs) and one TDOA observation (for the same two MSs) is $$A = \begin{bmatrix} \cos \Lambda_1 & -\sin \Lambda_1 \\ \cos \Lambda_2 & -\sin \Lambda_2 \\ -\frac{x-x_2}{d_2} + \frac{x-x_1}{d_1} & -\frac{y-y_2}{d_2} + \frac{y-y_1}{d_1} \end{bmatrix} \qquad (49)$$

where $d_i$ is the best derived distance between the CT and the $i^{th}$ MS assuming that the CT is far from the MS such that $d_{i,1} = d_{i,2} = \ldots = d_i$, where $d_{i,k}$ is the best derived distance between the CT and the $k^{th}$ antenna at the $i^{th}$ MS for i=1, 2. Note that the first two rows correspond to the two AOA measurements whereas the third row corresponds to the TDOA measurement. The two columns correspond to the two unknowns, x and y. Additional AOA and TDOA measurements may be included by adding appropriate rows to (49). Note that the 1/c factor seen in (43) is missing in the TDOA measurement row of (49). This is done such that the units throughout A are dimensionless.

The misclosure vector, necessary for the Least Squares adjustment mechanism, merely consists of the misclosures of all observations. The misclosure vector corresponding to the design matrix of (49) is $$w = \begin{bmatrix} (x-x_1)\cos \Lambda_1 - (y-y_1)\sin \Lambda_1 \\ (x-x_2)\cos \Lambda_2 - (y-y_2)\sin \Lambda_2 \\ c*\Delta\tau_{12} - \sqrt{(x-x_1)^2+(y-y_1)^2} + \sqrt{(x-x_2)^2+(y-y_2)^2} \end{bmatrix} \qquad (50)$$

where $\Delta\tau_{1,2} = \tau_1 - \tau_2$, assuming that the CT is far from the ith MS such that $\tau_{i,1} = \tau_{i,2} = \ldots = \tau_i$ for i=1, 2 and that $x_{i,1} = x_{i,2} = \ldots = x_i$ and $y_{i,1} = y_{i,2} = \ldots = y_i$.

Since the AOA and TDOA observations are independent, the unscaled observation covariance matrix is the identity matrix of appropriate dimension (number of AOA observations plus the number of TDOA observations).

Effect of Geometry on AOA/TDOA Positionine

DOP may again be used to quantify geometry. The DOPs (HDOP, EDOP, NDOP) can be found from $[A^T C_1^{-1} A]^{-1}$ where A and $C_1$ are defined immediately above.

Weighting of the AOA/TDOA Observations

The individual AOA and TDOA observations may be weighted through the observation covariance matrix $C_1$. Those AOA and/or TDOA observations deemed more reliable are assigned a smaller variance, or conversely, a heavier weight.

Blunder Detection in AOA/TDOA Positioning

Both the TDOA and AOA observations may contain blunders. Statistical testing of the observation residuals and misclosures may be used to detect observations which contain blunders.

6. AOA/Range Positioning:

If the time of transmission or round-trip delay is known, the range, $\hat{R}_i$, from the CT to the $i^{th}$ MS is the observed parameter. In that case, AOA and TOA positioning may also be combined in order to estimate the position of the CT with as little as two MSs. Without loss of generality, the design matrix A for two AOA observations (one at each of two MSs) and two range observations (one for each of the same two MSs) is $$A = \begin{bmatrix} \cos \Lambda_1 & -\sin \Lambda_1 \\ \cos \Lambda_2 & -\sin \Lambda_2 \\ -\frac{x - x_{1,k}}{d_{1,k}} & -\frac{y - y_{1,k}}{d_{1,k}} \\ -\frac{x - x_{2,k}}{d_{2,k}} & -\frac{y - y_{2,k}}{d_{2,k}} \end{bmatrix} \quad (51)$$

The misclosure vector corresponding to this design matrix is $$w = \begin{bmatrix} (x - x_1)\cos \Lambda_1 - (y - y_1)\sin \Lambda_1 \\ (x - x_2)\cos \Lambda_2 - (y - y_2)\sin \Lambda_2 \\ \hat{R}_1 - \sqrt{(x - x_1)^2 + (y - y_1)^2} \\ \hat{R}_2 - \sqrt{(x - x_2)^2 + (y - y_2)^2} \end{bmatrix} \quad (52)$$

Since the AOA and range observations are independent, the unscaled observation covariance matrix is the identity matrix of appropriate dimension (number of AOA observations plus the number of range observations).

Effect of Geometry on AOA/Range Positioning

DOP may again be used to quantify geometry. The DOPs (HDOP, EDOP, NDOP) can be found from $[A^T C_1^{-1} A]^{-1}$ where A and $C_1$ are defined immediately above.

Weighting of the AOA/Range Observations

The individual AOA and range observations may be weighted through the observation covariance matrix $C_1$. Those AOA and/or range observations deemed more reliable are assigned a smaller variance, or conversely, a heavier weight.

Blunder Detection in AOA/Range Positioning

Both the AOA and range observations may contain blunders. Statistical testing of the observation residuals and misclosures may be used to detect observations which contain blunders.

7. Speed and Direction of Travel Estimation:

In a kinematic location system, the 3-D or 2-D location of the moving CT must be estimated at various epochs of time. In addition, the doppler shift of the signal arriving at each MS may be estimated as discussed earlier. The equations relating the frequency (including Doppler shift) of the arriving signal at the MS to the CT speed, DOT and frequency offset are given in equations (35).

The estimation model for speed and DOT is, therefore, $$f_{i,k} - v/\lambda \cos(\phi - \Lambda_{i,k}) + \Delta f - \Delta f_o = 0 \quad (53)$$

where $\Delta f$, the frequency offset, is assumed to be equal for all MSs. Given that at any particular epoch the position of the CT (x,y) is estimated by one of the above methods, the angle $\Lambda_{i,k}$ in (53) may be calculated for each MS. In equation (53) then, the knowns are $f_{i,k}$, $\lambda$ and $\Lambda_{i,k}$, (where $f_{i,k}$ is measured or observed), and v, $\phi$, $\Delta f$ and $\Delta f_o$ are the unknowns. Three MSs are required—the same number required to estimate the 2D CT position using TOA or TDOA positioning.

Effect of Geometry on Speed and Direction of Travel Estimation:

Geometry affects the estimation of speed and DOT as well. For instance, it is intuitively obvious that when the CT is traveling on a line perpendicular to the line connecting it and an MS, no information regarding the speed of the CT is available from observed data at that MS.

The design matrix for the model of (53) is $$A = \begin{bmatrix} -\frac{\cos(\varphi - \Lambda_{1,k})}{\lambda} & \frac{v}{\lambda}\sin(\varphi - \Lambda_{1,k}) & -1 \\ -\frac{\cos(\varphi - \Lambda_{2,m})}{\lambda} & \frac{v}{\lambda}\sin(\varphi - \Lambda_{2,m}) & -1 \\ \vdots & \vdots & \vdots \\ -\frac{\cos(\varphi - \Lambda_{N,1})}{\lambda} & \frac{v}{\lambda}\sin(\varphi - \Lambda_{N,1}) & -1 \end{bmatrix} \quad (54)$$

The DOPs can again be found from $[A^T C_1^{-1} A]^{-1}$. In this case the DOPs will be speed DOP, direction of travel DOP, and frequency offset DOP. $C_1$ is the unscaled and unweighted identity matrix of dimension N.

Practical Description of the Invention

1. Description of the Invention wrt locating a powered-up CT

In order to locate a powered-up AMPs-CT one can use either the RECC channel or the RVC channel.

1.1 Using the RECC Channel:

When using the RECC channel, the invention consists of the following procedure:

Procedure I:

1. initiating a call to the designated CT by the Host;
2. monitoring the paging of the CT by a BS over a FOCC channel using a designated MS;
3. acquiring and processing the response, $r_{i,k}(t)$, of the phone to the page over the corresponding RECC channel by at least three MSs; and
4. dropping the call by the Host.

The above procedure, Procedure I, assumes no knowledge of the designated MS (or equivalently assumes no knowledge of either the FOCC channel or its corresponding RECC channel). This has two shortcomings:

i. Each MS has to contain at least three RECC receivers, one for the RECC channel designated to that cellular Base Station (BS) and two for the neighboring BSs that can receive $r_{i,k}(t)$ at an acceptable level.

ii. The procedure suffers from the fact that the probability of missing target is nonzero, i.e. a neighboring MS will occasionally fail to acquire $r_{i,k}(t)$.

An alternative procedure, Procedure II, that attempts to locate a powered-up AMPs-CT, assumes knowledge of the designated MS. In this case, the invention consists of the following procedure:

Procedure II:
1. Notifying the designated MS and its neighboring MSs to anticipate a page to the CT by the servicing BS by tuning to the corresponding RECC channel;
2. initiating a call to the designated CT by the Host;
3. monitoring the paging of the phone by the servicing BS over the corresponding FOCC channel;
4. acquiring and processing the response $r_{i,k}(t)$ of the phone to the page over the corresponding RECC channel by the MSs that have been notified; and
5. dropping the call by the Host.

In this case,
i. Each MS is required to contain only one tunable RECC receiver.
ii. The probability of missing target is somewhat reduced given that each MS has prior knowledge of the status of the CT and of its identity.

The above procedure, Procedure II, is based on the assumption that the servicing BS is known a priori. This is possible using the following procedure:

Procedure III:
1. initiating a call to the designated CT by the Host;
2. monitoring the paging of the phone by a number of MSs;
3. identifying the servicing BS;
4. notifying the Host of the identity of the servicing BS;
5. dropping the call by the Host.

In order to be truly passive, Procedure II should ensure that the call is dropped by the Host prior to having an alert signal uttered, i.e. prior to having the CT audibly ring.

In order to reduce installation and operational cost, Procedures I, II and III should have the MSs co-located in the cellular BSs and the communications network based on the existing link between BSs and Mobile Telephone Switching Office (MTSO). However, the patent does not require the MSs to be collocated in the cellular BSs.

In order to reduce the amount of information transmitted between MSs and Host, it is preferable to perform most of the processing at the MS. For example, if TDOA is employed for location, it is preferable to measure the TOA of the received RECC signal, $r_{i,k}(t)$, at the $i^{th}$ MS. The same is true for PDOA and FDOA. It is preferable to estimate the POA and the FOA of $r_{i,k}(t)$ at the $i^{th}$ MS and to transfer the estimated values to the Host for positioning purposes. In the TOA and POA cases, the required processing consists of correlating the RECC signal with a clean version of itself and sending the information regarding the correlation peaks to the Host, instead of performing a cross-correlation between each pair of received RECC signals at the Host. In the FOA case, the required processing consists of correlating the RECC signal with several clean versions of the RECC signal at different frequencies and sending the information regarding the correlation peaks to the Host.

The correlation peaks between $r_{i,k}(t)$ and a clean version of itself can be super-resolved using SR algorithms. It is sometimes preferable to perform the SR algorithms at the Host rather than performing them at the MS since it requires a number of computationally intensive operations that are easier to develop at the Host than at the MS. This implies that the correlation peak needs to be transferred to the Host which does not represent a large amount of information and can be easily transferred to the Host.

As mentioned above, diversity antennas or sector antennas or both can be used for PDOA positioning. Diversity signals can also be used to improve the SNR of the RECC signal by combining the two either through selection combining, Maximal Ratio Combining, or co-phasing combining. When diversity signals are utilized it can be more efficient to use one Digital Signal Processor (DSP) board per pair of diversity signals.

In order to be able to correlate the RECC signal, $r_{i,k}(t)$, at the $i^{th}$ MS, a clean version of $r_{i,k}(t)$ (i.e. s(t)) must be available at the $i^{th}$ MS beforehand. The only portion of the RECC signal that is known to each MS is the precursor as described above. The duration, T, of the precursor is only 4.8 msec. The duration of the RECC message can be as long as 125 msec which is an order of magnitude larger than the precursor. In order to take advantage of the entire RECC signal, one can use the following procedure:

Procedure IV:
1. Filter the entire RECC signal;
2. FM Demodulate the filtered signal;
3. Perform a nonlinear operation on the FM demodulated signal;
4. Extract the phase of a tone generated by the nonlinear operation in step 2; the tone can have a duration of up to 125 msec. and a frequency of twice the symbol rate, i.e. a frequency of 20 kHz; the phase of the tone is directly related to the TOA or the AOA of the signal.

The nonlinear operation can be either a quadratic operation (e.g. squaring the signal) or a delay product operation (i.e. multiplying the signal by a delayed version of itself).

Procedure IV can be used both for acquiring the RECC signal and for estimating its TOA. This is accomplished by stamping the time using a reliable clock at either the start of the generated tone or obtaining the time stamp at the end of the observation window (the latter is preferred).

Procedure IV can be improved by resolving the generated tone using SR algorithms. Moreover, the filtering required in step 1 of Procedure IV can be carried out in the digital domain in order to reduce the effect of temperature and aging on group delay variation.

Procedures I and II can be improved by repeating them a number of times and then averaging the location information (e.g. the TDOA, PDOA or FDOA between pairs of MSs).

The probability of location in Procedures I and II can be increased by repeating the procedures a number of times until at least 3 MSs have an acceptable signal level. This does not have to occur simultaneously between 3 MSs. The invention intends to select and combine only acceptable samples from each trial. This feature is unique to the invention.

A powered-up CT can also be tracked by repeatedly following Procedures I or II. This feature is unique to the invention.

1.2 Using the RVC Channel:
When using the RVC channel, the invention consists of the following steps:

Procedure V:
1. calling the designated CT by the Host;
2. monitoring the paging of the phone by a BS over a FOCC channel using a MS;
3. monitoring the response of the phone to the page over the corresponding RECC channel by the same MS;
4. monitoring the RVC channel assignment by the same MS over the corresponding FOCC channel;
5. notifying a plurality of MSs to monitor and process the response, $r_{i,k}(t)$, of the CT over the assigned RVC channel during an observation time $T_{i,k}$; and
6. dropping the call by the Host.

In step 5, the notification can be performed by the Host and the observation interval, $T_{i,k}$, can coincide with the "waiting for answer" mode.

The above procedure, Procedure V, can be improved by taking several samples of the signal $r_{i,k}(t)$ during a number of observation intervals while the phone is in the "waiting for answer" mode; then, averaging the location estimate over all samples.

In order to be truly passive, it is recommended that the call in Procedure V be dropped by the Host prior to having an alert signal uttered, i.e. prior to having the CT audibly ring. Often, this is impossible to accomplish and minimizing the effect of the alert signal by minimizing its duration is recommended instead.

Yet another important feature in Procedure V is the fact that the signal s(t) transmitted by the CT during "waiting for answer" mode is in fact a deterministic signal, i.e. a clean replica of the signal is always available at each MS. This leads to the fact that the duration of observation, $T_{i,k}$, of $r_{i,k}(t)$ can be increased substantially relative to the duration of the RECC signal in order to accommodate different situations. For example, in rural areas, where the cells are large, the SNR can be increased by increasing the duration of observation. Or equivalently, if the geometry is not good (i.e. HDOP is large, e.g. highway), one can improve it by increasing the duration of observation hence, increasing the number of MSs that receive the signal $r_{i,k}(t)$ at a reasonable level. It is the intention of the invention to optimize the duration of observation with respect to the SNR and HDOP. In addition to reducing HDOP by increasing the number of MSs, this also leads to reducing the effect of multipath, particularly in urban centers.

Procedure V can be improved by repeating it a number of times and then either averaging the location information or averaging the TDOA, PDOA or FDOA between pairs of MSs. This should be done while keeping in mind that the alert signal (i.e. audible ringing) is either avoided or minimized.

A suitable manner to process the signal $r_{i,k}(t)$ generated by the phone over the assigned RVC channel in order to estimate the POA of the RVC signal (as stated in step 5 of Procedure V) is to use the following procedure:
Procedure VI:
 1. Filter the RVC signal;
 2. Extract the phase of a tone that is known to exist over the RVC channel.

The tones that are known to exist over the RVC channel are either the SAT tone or the ST tone. The ST tone is preferable since it has a larger SNR than the SAT tone. However, the ST tone is only available in some situations depending on the selected network options.

Procedure VI can be improved by resolving the selected tone using SR algorithms. Moreover, the filtering required in step 1 of Procedure VI can be carried out in the digital domain in order to reduce the effect of temperature and aging on group delay variation.

In order to reduce the effect of co-SAT and co-ST Interference on the phase of the desired tone, the invention intends to use narrowband digital filters of few hertzs of bandwidth (e.g. Fourier Transform-based filters, sliding Fourier Transform-based filters, IIR filters, FIR filters, etc . . . ). The Fourier Transform-based filter has a bandwidth which is a function of the observation duration, $T_{i,k}$. The IIR filter has a steady state response time which is a function of $T_{i,k}$. In other words, the observation duration, $T_{i,k}$, has to be selected in order to optimize the SNR (increase it) versus the bandwidth of the filter (decrease it) versus the response time of the wireless location system (minimize it).

In order to reduce the effect of the multipath, $MP_{i,k}(t)$, on the performance of a kinematic wireless location system, the invention intends to resolve the different Doppler frequencies $\delta f_{i,k}$ (which correspond to different TOAs and different AOAs) and to choose the frequency corresponding to the first arrival. The method of resolving the different frequencies can be accomplished using SR algorithms.

It is also possible to locate a CT during "conversation" mode, i.e. when there is voice activity over the RVC channel. This can be achieved by estimating the pitch of the voice signal and extracting its phase information using Procedure VI.

Alternatively, it is also possible to locate a CT during "conversation" mode, without having to process the voice signal itself. This can be done by waiting for quiet periods of time when the voice signal is not used, which happens approximately 60% of the time during a conversation. In this case, the MS can follow hand-offs as the CT travels between cells which is a unique feature of the invention whereby a CT can be tracked over the duration of a conversation.

2. Description of the Invention wrt Locating a CT that is Initiating a Call

In order to locate an AMPs-CT that is initiating a call, one can use either the RECC channel or the RVC channel.

2.1 Using the RECC Channel:

When using the RECC channel, the invention consists of the following steps:
Procedure VII:
 1. monitoring the origination of the call by the CT over an RECC channel using a MS; and
 2. acquiring and processing the signal $r_{i,k}(t)$ of the CT over the RECC channel by at least three MSs.

The above procedure, Procedure VII, is a subset of Procedure I above and assumes no knowledge of the designated MS. This has several shortcomings:
 i. Each MS has to contain at least three RECC receivers, one for the RECC channel designated to that BS and at least two for the neighboring BSs that can receive $r_{i,k}(t)$ at an acceptable level.
 ii. The procedure suffers from the fact that the probability of missing target is nonzero, i.e. a neighboring MS will occasionally fail to acquire $r_{i,k}(t)$ since the probability of acquisition is below 100%.
 iii. When a call is operator-assisted, it is difficult to identify the called party.

Using the RVC Channel in this case is a preferable alternative to using the RECC channel since all shortcomings can then be avoided.

2.2 Using the RVC Channel:

When using the RVC channel, the invention consists of the following steps:
Procedure VIII:
 1. monitoring the initiation of the call by the CT over the RECC channel by a MS;
 2. monitoring the RVC channel assignment by a BS over the corresponding FOCC channel using the same MS; and
 3. notifying a plurality of MSs to monitor and process the signal $r_{i,k}(t)$ of the CT over the assigned RVC channel during an observation time $T_{i,k}$ which coincides with the phone being in the "unanswered conversation" mode.

The above procedure, Procedure VIII, can be improved by taking several samples of the signal $r_{i,k}(t)$ at the $k^{th}$ antenna of the ith MS over a number of observation intervals $T_{i,k}$ while the phone is in the "unanswered conversation" mode; then, averaging the location estimate over all samples.

An important feature for an E911 wireless location system is the time it takes to locate a 911 caller. With Procedure VIII above, it is possible to obtain a location while the phone is in the "unanswered conversation" mode which implies that the location information can be made available to the Public Safety Answering Point (P SAP) by the time the 911 call is answered.

Another important feature in Procedure VIII is the fact that the probability of location is 100%, unlike Procedure VII which is below 100%.

Yet another important feature in Procedure VIII is the fact that the signal s(t) transmitted by the CT during the "unanswered conversation" mode is in fact a deterministic signal, i.e. a clean replica of the signal can always be available at each MS. More specifically, as mentioned above, s(t) partially consists of either a SAT tone or an ST tone during the "unanswered conversation" mode. In this case, TOA and AOA information are contained in the phase of the tone and can be extracted using Procedure VI while the FOA information are contained in the frequency of the tone and can be extracted using Procedure X.

This leads to the fact that the duration of observation, $T_{i,k}$, of $r_{i,k}(t)$ can be increased substantially in order to accommodate different situations. For example, in rural areas, where the cells are large, the SNR can be increased by increasing the duration of observation. Or equivalently, if the geometry is not good (i.e. HDOP is large, e.g. highway), one can improve it by increasing the duration of observation, $T_{i,k}$, hence, increasing the number of MSs that receive the signal $r_{i,k}(t)$ at a reasonable level. It is the intention of the invention to optimize the duration of observation with respect to the SNR and HDOP. In addition to reducing HDOP, increasing the number of MSs also leads to reducing the effect of multipath, particularly in urban centers.

Procedure VIII can be improved by resolving the tone using SR algorithms. Moreover, the filtering required in step 1 of Procedure VI can be carried out in the digital domain in order to reduce the effect of temperature and aging on group delay variation.

In order to reduce the effect of co-SAT and co-ST Interference on the phase of the desired tone, the invention intends to use narrowband digital filters of few hertzs bandwidth (e.g. Fourier Transform-based filters, sliding Fourier Transform-based filters, IIR filters, FIR Filters, etc . . . ). The Fourier Transform-based filter has a bandwidth which is a function of the observation duration, $T_{i,k}$. The IIR filter has a steady state response time which is a function of $T_{i,k}$. In other words, the observation duration, $T_{i,k}$, has to be selected in order to optimize the SNR (increase it) versus the bandwidth of the filter (decrease it) versus the response time of the wireless location system (minimize it).

It is also possible to locate a CT during the "answered conversation" mode, i.e. when there is voice activity over the RVC channel. This can be achieved by estimating the pitch of the voice signal using Procedure X and extracting its phase information using Procedure VI.

Alternatively, it is also possible to locate a CT during the "answered conversation" mode, without having to process the voice signal itself. This can be done by waiting for quiet periods of time when the voice signal is not used (which happens approximately 60% of the time during a conversation). In this case, the MSs can follow the hand-offs of the CT by the BSs as the CT travels between cells in a kinematic location system, or alternatively, it can average the location information or the TDOA, PDOA or FDOA information in a static location system. This feature of tracking a CT over the duration of a conversation is unique to the invention.

In order to reduce the effect of multipath on the performance of a kinematic wireless location system, the invention intends to resolve the different Doppler frequencies (which correspond to different TOAs and different AOAs) and choose the frequency corresponding to the first arrival. The method of resolving the different frequencies can be accomplished using SR algorithms.

Description of the Invention wrt the Hardware

In order to 1. reduce or avoid:
    Gain Imbalance;
    Phase Imbalance;
    Carrier Feed-through; and
    DC offset,
2. be able to use the same RF front end for all standards (analog or digital) over a fixed band; and
3. reject out-of-band Interferers (e.g. paging, trunked radio, etc.) using digital filters in the Digital Signal Processor (DSP), the invention intends to use a linear IF-sampling receiver for the RVC channel and the RECC channel. The IF-sampling receiver at the $i^{th}$ MS is designed to have high rejection, low group delay variation and good sensitivity. In order to have high rejection with good sensitivity, the receiver is designed to have (see FIG. 8):

Design I:

1. A number of Intermediate Frequency (IF) stages (810) that convert the received RF signal Re{$r_{i,k}(t)$} exp (j$2\pi f_c t$) (801) to an IF signal (807) of IF frequency $f_1$. Initial rejection is achieved at RF using an RF Band Pass Filter (BPF) (802), followed by an RF amplifier (803) for good sensitivity. Subsequent rejections are achieved at each IF stage which consist of a mixer (804) followed by an Intermediate Frequency (IF) BPF filter (805) and an IF amplifier (806).
2. A pre-aliasing filter (811) precedes the Analog-to-Digital converter (812) that converts the IF analog signal to an IF digital signal. The sampling rate is intended to be below the Nyquist rate in order to force aliased copies of the IF signal (807) close to a lower digital IF, $f_2$.
3. Digital filters (813) which reject noise and interference outside of the digital IF bandwidth.
4. A Digital Down Converter (DDC) (804) which converts the (real) digital IF signal to a (complex) digital baseband signal (optional).

In order to have low group delay variation, the following procedure is suggested:

Procedure IX:

1. Characterize the overall group delay, $\Delta t_{i,k}$, of the $k^{th}$ antenna of the $i^{th}$ MS prior to operation.
2. Estimate the carrier offset (818), (due to Doppler, $\delta f_{i,k}$, and due to LO offset, $\Delta f_{i,k}$) of the signal $r_{i,k}(t)$ (801) using Digital Signal Processor (DSP) (817).
3. Adjust the Local oscillators (808) in the receiver corresponding to the $k^{th}$ antenna of the $i^{th}$ MS during reception of $r_{i,k}(t)$ (801) based on the estimated carrier offset (818), in step 2 above.
4. Remove $\Delta t_{i,k}$ from the estimated Time Of Arrival $\tau_{i,k}$.

Explanation of Procedure IX: Since $\Delta t_{i,k}$ is a function of frequency, it can vary significantly from one frequency to another. Furthermore, according to the AMPs standard, $\Delta f_{i,k}$ can be as large as 2 kHz. For this reason, it is important to force the estimation of $\Delta t_{i,k}$ in step 1 of Procedure IX to be independent of the carrier offset, $\Delta f_{i,k}+\delta f_{i,k}$. This is accomplished by estimating the carrier offset, $\Delta f_{i,k}+\delta f_{i,k}$, in step 2 of Procedure IX and removing it in step 3 of Procedure IX prior to processing it for location purposes. In other words, steps 2 and 3 force the overall group delay, $\Delta t_{i,k}$, to remain similar to its original characterization in step 1 above, thereby reducing overall group delay variations due to frequency offsets. In order to reduce overall group delay variations due to temperature and aging, step 1 in Procedure IX has to be performed on a regular basis.

Notes:
1. In Procedure IX, step 1 can be performed as part of a calibration procedure described below in Procedure XI.
2. In Procedure IX, step 2 can be performed using a discrete Carrier Recovery Loop (CRL) described in Procedure X.
3. In Procedure IX, step 3 can be performed using a Direct Digital Synthesiser (DDS) (809).

The discrete Carrier Recovery Loop consists of several steps that are repeated a number of times until a satisfactory level of performance is reached:

Procedure X:
1. Digitally Signal Process the sampled IF signal (814 or 816) using the DSP (817) in order to derive an adequate objective function, $f_{obj}$.
2. If $f_{obj}$ is optimized to within a certain constraint, stop the loop, otherwise:
3. search for a new frequency offset (818),
4. adjust the LO (808) by the new frequency offset (818), and
5. go back to step 1.

In Procedure X, step 3 can be performed using a gradient-type search algorithm or any other suitable search algorithm.

In Procedure X, step 4 can be performed using either a DDS (809) only or a DDS and a Digital Down-Converter (DDC) (815). If a DDS (815) only is used in step 4, then step 1 in Procedure X processes a new segment of the signal, $r_{i,k}(t)$, every iteration. If a DDS (809) and a DDC (809) are used is step 4, then step 1 in Procedure X processes the same stored segment of the signal, $r_{i,k}(t)$, every iteration until the DDS (809) is used. It is preferred to use both the DDC and the DDS in order to reduce the effect of finite precision arithmetic on the estimation process.

In the case when Design I does not contain step 4, the DSP (817) in step 1 of Procedure X of the carrier recovery loop can consist of a digital notch filter centered at the desired IF frequency $f_2$, whose power of response is to be minimized, i.e. $f_{obj}$ is the response of the digital notch filter. In this case, the notch filter can consist of
1. a first digital Band Pass Filter centered at the $f_2$+frequency of desired Tone; and
2. a second digital Band Pass Filter centered at the $f_2$-frequency of desired Tone.

The Band Pass filters can be implemented using (real) digital Biquadratic filters.

Alternatively, the DSP (817) in step 1 in Procedure X of the carrier recovery loop can consist of a digital Band Pass Filter centered at the desired IF frequency $f_2$, whose power of response is to be maximized, i.e. $f_{obj}$ is the response of the Band Pass Filter. In this case, the BPF can be implemented as a (complex) $1^{st}$ order (or higher) digital IIR filter.

In the case when Design I contains step 4, the signal to process is a baseband signal (816) and the digital BPF turns into a simple (complex) LPF. An example of such a LPF is an averaging filter which adds all real samples together and all imaginary samples together over the observation interval.

In order to reduce the effect of clock errors and LO offset (or drift), $\Delta f_{i,k}$, the invention intends to use a common reference for all the LOs and for all the clocks. A suitable common reference for the LOs and for the clocks can be derived from the GPS signal.

Given that all LOs in the MSs have a common reference implies that
$\Delta f_{1,m} = \Delta f_{2,k} = \Delta f_{3,n} = \Delta f$
in equations (35) and that it is possible to estimate the speed, v, and Direction Of Travel (DOT), $\phi$, from the carrier offsets that are estimated from Procedure X at each MS using the discrete carrier recovery loop. This can be accomplished using the Frequency Difference of Arrival (FDOA) between each pair of MS as expressed in equations (36).

Description of the Invention wrt Calibration Methods

A wireless location system has to be calibrated prior to operation (and occasionally during operation) in order to remove the effect of the overall Group Delay, $\Delta t_{i,k}$, at each MS. Moreover, temperature and aging can cause the overall Group Delay to change with time. Therefore, it is necessary to calibrate the system on a regular basis. A method to calibrate a wireless location system is as follows:

Procedure XI:
1. calling a CT whose location is known to the Host;
2. monitoring the paging of the CT by a BS over the corresponding FOCC channel using a MS;
3. monitoring the response of the phone to the page over the corresponding RECC channel by the same MS;
4. monitoring the RVC channel assignment by the same MS over the corresponding FOCC channel;
5. notifying a plurality of MSs to monitor the signal $r_{i,k}(t)$ of the CT over the assigned RVC channel during an observation time $T_{i,k}$; and
6. dropping the call;
7. estimating the relative group delay between MSs by comparing the estimated location of the CT with the known location of the CT after using Procedure X to adjust for the carrier offset of the CT. The estimated location of the CT is based on the measured TDOAs of the CT signal.

Procedure XI can be repeated a number of times in order to average the relative group delay over time. In order to reduce deployment cost of a CT at known locations, the invention intends to store a CT inside a number of MSs. This allows for automatic calibration without a need for human intervention.

In order to minimize the relative group delay variations between calibration intervals, it is recommended to use SAW filters as the BPF (803, 805, 811) in FIG. 8. It is also recommended to place the SAW filters (803, 805, 811) in a metallic block to minimize flexing effects due to temperature variations.

Description of the Invention wrt the Host Software

In order to reduce the effect of limited BW in AMPs, the invention intends to either
1. use SR algorithms; or to
2. virtually increase the BW of p(t); or both.

In order to virtually increase the effective BW of the channel one has to:
1. force the CT to transmit over a number of channels (RECC, RVC or both); and
2. combine the TOA estimation from all such channels.

A method to force the CT to use several channels consists of repeating Procedures I, II or V several times in the hope that the channel (either RECC or RVC) changes from time to time. The RVC channel has a better chance to change from time to time than the RECC channel.

A unique feature of the patent is the fact that it has a 100% probability of acquisition. In other words, the Host can order a large number of MSs to tune to the assigned RVC in Procedure V, thereby generating a large redundancy in the observations. This is not necessarily useful when an observation has a blunder in it. On the other hand, a large number of observations implies a small HDOP. Therefore, the Host is required to optimize the number of observations in order to minimize the positional error of the CT.

Given a number of positioning algorithms and a number of methods for blunder detection, the invention makes use of positioning strategy illustrated in FIGS. 9a, 9b, 9c and 9d. FIG. 9 illustrate the preferred embodiment for adjusting the observed TOAs such that the sum of the squares of the residuals is a minimum. Other methods for adjusting the observed TOAs such that the sum of the squares of the residuals is a minimum are available including:

General Minimum Variance Unbiased Estimation,
Best Linear Unbiased Estimation
Maximum Likelihood Estimation,
Method of Moments,
General Bayesian Estimation,
Linear Bayesian Estimation,
Kalman Filtering, etc.

The positioning process begins with a set of TOA observations from a minimum of three MSs. If only three TOAs are available (901), solution bifurcation is tested for (902). In the event of solution bifurcation, the LOCA algorithm (903) is performed on the TOA observations yielding two solutions. These two solutions are each used as the initial position for Least Squares (904 and 905) resulting in two Least Squares solutions for the CT. The Least Squares algorithm here, and in all other parts of FIG. 9, is Hybrid TDOA positioning with received signal strength used to weight the individual MS observations. During every iteration of Least Squares, misclosures for each MS are calculated. If any misclosure exceeds some multiple of the RMS value of the entire set of misclosures, the corresponding MS, and its TOA, is no longer used within that particular execution of Least Squares.

If both Least Squares solutions (904 and 905) converge (906) but are not equal (907), it is assumed that Least Squares has converged to the two possible solutions and both Least Squares solutions are reported as possible positions for the CT (908). If the either of the LS solutions diverge (906) or the convergent solutions are equal (907), the two LOCA solutions from (903) are reported as possible positions of the CT (909).

If at (902) bifurcation is found to not exist, LOCA is again executed (910) but yields only one solution. This solution is used as the initial position in Least Squares (911).

When redundancy does exist (901), Plane Intersection (912) (or any other closed-form position estimation algorithm) is executed. The resulting solution is used as the initial position for Least Squares (913). At this point a check is made as to whether Least Squares (913 or 911) converged (914). If Least Squares converges, another check for observational redundancy is made (915). If there is no redundancy, the Least Squares solution is reported as the position estimate of the CT (923). If there is redundancy, the normalized residuals are statistically tested for normality (916). The Least Squares solution is reported (923) should all residuals pass. If any residuals fail, the redundancy numbers of the failing observations are checked (917). The redundancy number of the $i^{th}$ observation is defined as $$g_i = (C_r C_l^{-1})_{ii} \quad (55)$$

where $C_r$ is the covariance matrix of the residuals and is defined as $$C_r = C_1 - A[A^T C_1^{-1} A]^{-1} A^T. \quad (56)$$

Should all failing observations have redundancy numbers less than some threshold (in the preferred embodiment of the invention, this threshold is 0.5), the Least Squares solution is reported as the CT position estimate (923).

If observations with failing residuals have redundancy numbers larger than the threshold (917), that observation with redundancy number greater than the threshold and with the largest standardized residual is permanently removed from the observation set (928). The initial position used for the previous execution of Least Squares is remembered (929) and used again in Least Squares with the truncated observation data set (930 or 931).

Should Least Squares now diverge (932), the previous Least Squares solution which did converge is reported as the position estimate of the CT (936). If Least Squares does converge (932), and there is no redundancy (933), the newly convergent Least Squares solution is reported (936). If there is redundancy (933), the standardized residuals are tested for normality (934). Should all the residuals pass, the newly convergent Least Squares solution is reported (936). Otherwise, if all failing observations have redundancy numbers less than some threshold (in the preferred embodiment of the invention, this threshold is 0.5), the newly convergent Least Squares solution is reported (936).

If observations with failing residuals have redundancy numbers larger than the threshold (935), that observation with redundancy number greater than the threshold and with the largest standardized residual is permanently removed from the observation set (928). The process then continues as described immediately above.

If at (914) Least Squares diverges, Least Squares is executed again but with the average of participating MSs coordinates used as the initial position (918). If Least Squares now converges (919) but there is no observation redundancy (920), the newly convergent Least Squares solution is reported as the position estimate of the CT (923). If there is redundancy (920), the standardized residuals are tested for normality (921). Should all residuals pass, the newly convergent Least Squares solution is reported (923). If some of the residuals fail but none of the corresponding observations have redundancy numbers greater than some threshold (922), the newly convergent Least Squares solution is reported (923).

If observations with failing residuals have redundancy numbers larger than the threshold (922), that observation with redundancy number greater than the threshold and with the largest standardized residual is permanently removed from the observation set (928). The process then continues from (928) as described above.

When Least Squares does not converge at (919), and there is no redundancy (924), either no solution is reported for this particular set of observation data or the solution from the last iteration before divergence is reported (927). If there is redundancy, but all of the standardized residuals pass the normality test (925), no solution is reported for this particular set of observation data or the solution from the last iteration before divergence is reported (927). Should some of the residuals fail, the observation with the largest standardized residual is permanently removed from the data set regardless of its redundancy number. The process then begins at point (912) as described above.

FIG. 9 are also applicable for,
AOA positioning,
AOA/TDOA positioning, and
AOA/Range positioning.

Description of the Invention wrt Transferring Location Information of the CT over the Internet Given that the Internet is global and inexpensive, the communication between the Host and the customer can be achieved over it. For example when a CT calls 911 for emergency, it is possible to relay the positional information of the CT from the Host to the PSAP over the internet. Similarly, in the case when a powered-on CT is to be located by a customer, its positional information can be relayed from the Host to the customer through the internet. The utility of the internet in its capacity of transferring CT location information on a global scale, extends the application of the wireless location system beyond the cellular network for which the MS's have been deployed. Through the latest internet technology such as Java, JavaBeans, as well as CORBA (Common Object Request Broker Architecture), CT location information residing at the Host can be integrated with third-party information (i.e. a map database, or a database consisting of geo-coded business addresses such as restaurants, towing companies, etc.) residing in some other geographical location, perhaps even in another country. The combination of this CT location information with the third party information can be transferred over the internet to allow customers to locate a particular CT wrt to either a map location (i.e. street address) and/or a business location, provided that the CT is within network coverage for the wireless location system. Through this process the CT location information and the third party database information can be accessed or "served up" to the customer through efficient Java Internet technology processes. The service provider will integrate together the various components including the CT location information derived from the wireless location system and the third-party information database. The integration process of the different databases is transparent to the customer. The customer will only know that the location-based service exists as such to bring all of the different components together to provide for a complete service which can be offered either on a regional, national or perhaps global basis. Through the internet these location-based services can now be offered on an economical basis to the customer. Examples of such services are fleet management, concierge services, roadside assistance, child find services, etc.

Legality and security aspects are a concern on the internet and a dedicated link might be sometimes necessary.

A person skilled in the art could make immaterial modifications to the invention described in this patent document without departing from the essence of the invention that is intended to be covered by the scope of the claims that follow.

There are several inventions disclosed in this patent document, and numerous aspects of each of those inventions. Wherever "the intention of the invention" or "intention of the patent" is referred to, this means that the following item is an intention of an aspect of one of the inventions and not necessarily the intention of all the inventions or the intention of all aspects on one or more inventions.

Further, where an invention is said to "consist of" something in the detailed description, this particular aspect of the invention incorporates the mentioned steps or their equivalents. Where an element or step is said to be crucial (or like words), this refers to the element or step being crucial to the particular aspect of the invention being discussed, and may not be crucial to other aspects of the invention or other intentions. Where the invention is said to "intend" to do something for a purpose, then this means that, for the particular purpose stated, it is preferred to do that thing in the carrying out of the invention.

We claim:

1. A method of estimating the location of a cellular telephone that is initiating a call, the method comprising the steps of:
    monitoring the initiation of the call over a reverse control channel using a first monitoring site;
    monitoring a reverse voice channel assignment over the corresponding forward control channel using the first monitoring site;
    notifying a plurality of monitoring sites to monitor the signal s(t) generated by the cellular telephone over the assigned reverse voice channel during an observation time T which coincides with the cellular telephone being in either answered conversation mode or unanswered conversation mode;
    processing the signal s(t) by each one of the plurality of monitoring sites by estimating the phase of one of a SAT tone resolved using superresolution algorithms and a tone derived from the pitch of the signal s(t) and resolved using superresolution algorithms;
    estimating the location of the cellular telephone from the estimated phase to generate a location estimate; and
    transferring the location estimate to a user during unanswered conversation mode.

2. A method of estimating the location of a cellular telephone that is initiating a call, the method comprising the steps of:
    monitoring the initiation of the call over a reverse control channel using a first monitoring site;
    monitoring a reverse voice channel assignment over the corresponding forward control channel using the first monitoring site;
    notifying a plurality of monitoring sites to monitor the signal s(t) generated by the cellular telephone over the assigned reverse voice channel during an observation time T which coincides with the cellular telephone being in answered conversation;
    processing the signal s(t) received by each one of the plurality of monitoring sites by estimating the phase of a SAT tone resolved using superresolution algorithms only over quiet periods of time where no speech is uttered; and
    estimating the location of the cellular telephone from the estimated phase to generate a location estimate.

3. A method of estimating the location of a cellular telephone that is initiating a call, the method comprising the steps of
    monitoring the initiation of the call over a reverse control channel using a monitoring site;
    monitoring a reverse voice channel assignment over the corresponding forward control channel using the same monitoring site; and
    notifying a plurality of monitoring sites to monitor and process a signal s(t) generated by the cellular telephone over the assigned reverse voice channel during an observation time T which coincides with the cellular telephone being in unanswered conversation mode; and
    estimating the location of the cellular telephone from the signal s(t) to obtain a location estimate.

4. The method of claim 3 further comprising:
    taking a plurality of samples of the signal s(t) during a plurality of observation intervals while the cellular telephone is in unanswered conversation mode; and
    averaging the location estimate over the plurality of samples.

5. A method of estimating the location of a powered-up cellular telephone, the method comprising the steps of
- calling the cellular telephone by paging the cellular telephone;
- monitoring the paging of the cellular telephone over a forward control channel using a monitoring site;
- acquiring and processing the response s(t) of the cellular telephone to the page over the corresponding reverse voice channel at each one of a plurality of monitoring sites;
- performing a nonlinear operation on the received signal s(t) at each one of the monitoring sites to generate at least one tone;
- dropping the call; and
- estimating the location of the cellular telephone from the tone generated by performing the nonlinear operation on the received signal.

6. The method of claim 5 further comprising the steps of:
- FM demodulating the received signal s(t) at each one of the monitoring sites before performing a non-linear operation on the received signal s(t); and
- performing a nonlinear operation comprises performing the nonlinear operation on the FM demodulated signal at each one of the monitoring sites.

7. The method of claim 5 wherein the nonlinear operation is selected from the group consisting of:
- a quadratic operation;
- a delay product operation; and
- an absolute value operation.

8. The method of claim 5 further comprising the step of
- notifying a plurality of monitoring sites to anticipate the response s(t) of the cellular telephone over a specified reverse control channel.

9. The method of claim 5 wherein estimating the location of the cellular telephone is based upon the phases of the generatid at least one tone.

10. The method of claim 9 wherein the generated at least one tone is resolved using superresolution algorithms.

11. The method of claim 5 wherein the call is dropped before the cellular telephone is allowed to utter an alert signal.

12. The method of claim 11 wherein the step of estimating the location of the cellular telephone is achieved by a step selected from the group consisting of:
- estimating the time of arrival of the signal s(t) at some of the plurality of monitoring sites,
- estimating the angle of arrival of the signal s(t) at some pairs of the plurality of monitoring sites, and
- estimating both the time of arrival and the angle of arrival of the signal s(t) at some of the plurality of monitoring sites.

13. The method of claim 12 wherein the step of estimating the angle of arrival of the cellular telephone at some pairs of the plurality of monitoring sites is achieved by co-locating the monitoring sites within a plurality of base stations and estimating the angle of arrival between pairs of cellular diversity antennas at the base stations or pairs of cellular sector antennas at the base stations.

14. The method of claim 11 further comprising:
- repeating the steps in claim 5 a plurality of times to generate location estimates; and
- averaging the location estimates over the plurality of times.

15. The method of claim 11 wherein the monitoring sites are co-located within a plurality of base stations.

16. The method of claim 15 wherein only one RF front end is used per antenna at each base station.

17. The method of claim 5 wherein the signal s(t) is filtered prior to performing the nonlinear operation.

* * * * *

UNITED STATES PATENT AND TRADEMARK OFFICE
CERTIFICATE OF CORRECTION

PATENT NO.    : 6,330,452 B1
DATED         : December 11, 2001
INVENTOR(S)   : M. Fattouche et al.

It is certified that error appears in the above-identified patent and that said Letters Patent is hereby corrected as shown below:

<u>Title page, Item [54] and Column 1, lines 1-3,</u>
Title, "NETWORK-BASED WIRELESS LOCATION SYSTEM TO POSITION AMPS (FDMA) CELLULAR TELEPHONES, PART I" should read -- NETWORK-BASED WIRELESS LOCATION SYSTEM TO POSITION AMPS (FDMA) CELLULAR TELEPHONES --

Item [56], References Cited, U.S. PATENTS DOCUMENTS, insert in appropriate order the following:
-- 5,786,791     7/1998     Bruckert
5,999,131       12/1999    Sullivan --

<u>Column 44,</u>
Line 11, "to monitor the" should read -- to monitor a --
Line 18, "SAT" should read -- Supervisory Audio Tone (SAT) --
Line 34, "to monitor the" should read -- to monitor a --
Line 38, "answered conversation;" should read -- answered conversation mode; --
Line 42, "SAT" should read -- Supervisory Audio Tone (SAT) --
Line 49, "steps of" should read -- steps of: --
Line 53, "forward control channel" should read -- forward channel --
Line 54, "monitoring site; and" should read -- monitoring site; --
Line 59, "conversation mode; and" should read -- conversation
mode, wherein processing of the signal s(t) comprises
estimating the phase of one of:
   a Supervisory Audio Tone (SAT) resolved using
      superresolution algorithms; and
   a Signaling Tone (ST) resolved using
      superresolution algorithms; and --

<u>Column 45,</u>
Line 2, "the steps of" should read -- the steps of: --
Line 8, "processing the response" should read -- processing a response --
Line 11, "the received signal" should read -- the received response --
Line 12, "the monitoring sites" should read -- the plurality of monitoring sites --
Line 18, "on the received signal." should read -- on the received response. --
Line 21, "the received signal" should read -- the received response --
Line 23, "the received signal" should read -- the received response --
Line 24, delete "performing a nonlinear operation comprises"
Line 25, "demodulated signal" should read -- demodulated response --
Line 32, "the step of" should read -- the step of: --
Line 38, "generatid" should read -- generated --

UNITED STATES PATENT AND TRADEMARK OFFICE
CERTIFICATE OF CORRECTION

PATENT NO.    : 6,330,452 B1
DATED         : December 11, 2001
INVENTOR(S)   : M. Fattouche et al.

It is certified that error appears in the above-identified patent and that said Letters Patent is hereby corrected as shown below:

<u>Column 46,</u>
Line 10, "the signal" should read -- the response --
Line 12, "the signal" should read -- the response --
Line 16, "the signal" should read -- the response --
Line 36, "the signal" should read -- the response --

Signed and Sealed this

Second Day of July, 2002

Attest:

JAMES E. ROGAN
Attesting Officer          Director of the United States Patent and Trademark Office